United States Patent [19]

Kawamura et al.

[11] Patent Number: 5,720,214
[45] Date of Patent: Feb. 24, 1998

[54] FLUID SUPPLY ASSEMBLY FOR WORKING VEHICLES

[75] Inventors: Masahisa Kawamura, Amagasaki; Hideki Amano, Nishinomiya, both of Japan

[73] Assignee: Kanzaki Kokyukoki Mfg. Co., Ltd., Amagasaki, Japan

[21] Appl. No.: 791,828

[22] Filed: Jan. 30, 1997

[30] Foreign Application Priority Data

Apr. 17, 1996 [JP] Japan .................................. 8-120943

[51] Int. Cl.⁶ .................................................. F15B 11/16
[52] U.S. Cl. ........................... 91/522; 91/530; 172/439; 180/900
[58] Field of Search ........................... 91/522, 526, 530, 91/531, 532; 172/439, 442, 450; 180/306, 900

[56] References Cited

U.S. PATENT DOCUMENTS

| | | | |
|---|---|---|---|
| 2,638,045 | 5/1953 | Heitshu | 172/439 |
| 4,183,287 | 1/1980 | Hamada et al. | 91/536 |
| 4,643,442 | 2/1987 | Ohashi et al. | 280/461 A |
| 5,479,845 | 1/1996 | Kawamura et al. | 91/514 |

FOREIGN PATENT DOCUMENTS

| | | | |
|---|---|---|---|
| 52-104803 | 8/1977 | Japan . | |
| 57-146502 | 9/1982 | Japan . | |
| 57-158307 | 10/1982 | Japan . | |
| 1-42970 | 12/1989 | Japan . | |
| 1603204 | 11/1981 | United Kingdom | 172/439 |

OTHER PUBLICATIONS

Operator's Manual for International 1566 and 1568 Tractors, pp. 36 and 39–41.

*Primary Examiner*—F. Daniel Lopez

[57] ABSTRACT

In a working vehicle including a first control valve assembly (15) for controlling the operation of a hydraulic lift cylinder (14), a cylinder case (13) of the lift cylinder includes, at one of its side surfaces, a vertical seating surface (52) on which a second control valve assembly (20) for controlling the operation of plural another hydraulic actuators (18, 19) is mounted. The second valve assembly includes plural control valve spools (31, 32) which extend in the valve case axially of the vehicle at levels different from one another. Of ports in the valve case, fluid inlet port (26), fluid outlet port (27) for conducting fluid towards the first valve assembly which is mounted on the cylinder case preferably at a lower surface thereof, and fluid drain port (30) open at the seating surface for connecting these ports directly to corresponding fluid passages in the cylinder case, while fluid output ports (28A, 28B, 29A, 29B) for conducting fluid towards the actuators open at an outer side surface of the valve case.

11 Claims, 15 Drawing Sheets

FLUID SUPPLY ASSEMBLY FOR WORKING VEHICLES

FIELD OF THE INVENTION

This invention relates to a fluid supply assembly for working vehicles, such as tractors.

More particularly, the present invention relates to a fluid supply assembly for use in a working vehicle which comprises: a hydraulic lift cylinder for lifting and lowering an auxiliary implement to be connected liftably to the vehicle, a single hydraulic pump for supplying fluid to the hydraulic lift cylinder and to plural another hydraulic actuators employed in the vehicle, a first control valve assembly for controlling the operation of the hydraulic lift cylinder, and a second control valve assembly for controlling the operation of the hydraulic actuators. The hydraulic lift cylinder has a cylinder case on which the first control valve assembly is mounted. The second control valve assembly is adapted such that fluid is supplied to the first control valve assembly through the second control valve assembly.

BACKGROUND OF THE INVENTION

In a working vehicle, such as a tractor, a hydraulic lift cylinder for lifting and lowering an auxiliary implement, such as a rotary tiller, to be connected liftably to the rear of the vehicle, is generally mounted on an upper surface of a rear end portion of the vehicle body. A control valve assembly for controlling the supply of fluid to the hydraulic lift cylinder and to thereby control the operation of this lift cylinder is mounted on the cylinder case of the lift cylinder by arranging the valve assembly on an upper surface of the cylinder case as shown, for example, in JP, U No. 52-104803, on a lower surface of the cylinder case as shown, for example, in JP, Y2 No. 1-42970, or on an outer side surface of the cylinder case as shown, for example, in U.S. Pat. Nos. 4,643,442 and 5,479,845. It is already known from, for example, these two U.S. patents, and from JP, A No. 57-146502 and JP, U No. 57-158307 to supply fluid by a single hydraulic pump to the hydraulic lift cylinder and to plural another hydraulic actuators employed in the vehicle, such as a lift cylinder and tilt cylinder for operating a bucket of a front loader which is connected to a front of the vehicle, and to mount a second control valve assembly for controlling the operation of such hydraulic actuators also on the cylinder case of the hydraulic lift cylinder together with a first control valve assembly for the hydraulic lift cylinder.

Of these known fluid supply assemblies, the assembly shown in JP, U No. 57-158307 comprises a first control valve assembly for the hydraulic lift cylinder which is mounted on an outer side surface of the cylinder case of the hydraulic lift cylinder, and plural actuator-control valves for plural another hydraulic actuators which are integrated successively on an outer side surface of the first control valve assembly. A fluid inlet port for receiving fluid from a single pump is provided to the first control valve assembly which is adapted to supply fluid therethrough to the actuator-control valves. Fluid output ports of the plural actuator-control valves are arranged such that they open at rear sides of these control valves. In the fluid supply assembly shown in JP, A No. 57-146502, an actuator-control valve assembly for plural hydraulic actuators is composed of a flow regulator valve, plural control valves for the actuators, and a cover member which are successively integrated on an outer side surface of the cylinder case of hydraulic lift cylinder at a front end portion of the side surface. A first control valve assembly for the hydraulic lift cylinder is mounted on a lower surface of the cylinder case. The flow regulator valve includes a fluid inlet port for receiving fluid from a single pump, and the cover member includes a fluid passage for conducting fluid from the actuator-control valve assembly towards the first control valve assembly. A fluid pipe is employed for connecting between a fluid outlet port of the actuator-control valve assembly and a fluid inlet port of the first control valve assembly. Though fluid output ports of the actuator-control valves are not indicated clearly, it is believed that these ports open upwards of the second control valve assembly.

Each of the fluid supply assemblies detailed above includes a so-called stack valve composed of plural valves which are successively integrated on an outer side surface of the cylinder case of hydraulic lift cylinder. And, such a stack valve is disposed between a narrow space between the cylinder case and a rear wheel fender of one side. Such arrangement will make assembling and piping operations very difficult.

The fluid supply assembly shown in the above-referenced U.S. Pat. No. 4,643,442 aims to eliminate this drawback by making use of a cylinder head of the cylinder case of hydraulic lift cylinder. The cylinder head includes, in its front surface, a vertical seating surface on which an actuator-control valve assembly is mounted. This valve assembly is composed of plural actuator-control valves and a frontmost cover member which are successively integrated on the seating surface. A fluid inlet port for receiving fluid from a single pump is formed in the cover member such that it opens forwardly of the cover member, whereas fluid output ports of the valve assembly are formed such that they open upwardly of the assembly. A first control valve assembly for the hydraulic lift cylinder is mounted on an outer side surface of the cylinder case and is adapted to be supplied with fluid from the actuator-control valve assembly through fluid passages in the cylinder case and cylinder head.

In the structure according to this U.S. patent, a space in front of the cylinder head of the cylinder case is skillfully used such that the actuator-control valve assembly can be assembled with ease. However, because the position of the frontmost cover member and the fluid inlet port formed therein is varied in an axial direction of the vehicle when the number of the control valves in the actuator-control valve assembly is varied, fluid piping between the pump and the fluid inlet port in the cover member must be changed in response to the number of the actuator-control valves. Further, the fluid output ports which open upwardly of the actuator-control valve assembly require, in a vehicle having a seat disposed at a location above the cylinder case, fluid pipings in a space between the seat and the valve assembly, so that the level of seat tends to be hightened excessively because of a required piping space in a small-sized working vehicle.

The fluid supply assembly shown in the above-referenced U.S. Pat. No. 5,479,845 aims to solve such problems by providing a fluid inlet port, which receives fluid from a single pump, to a cylinder head of the cylinder case of hydraulic lift cylinder such that this inlet port opens at an outer side surface of the cylinder head. A second control valve assembly for plural hydraulic actuators is mounted on a vertical seating surface, which is formed in a front surface of the cylinder head, such that fluid output ports of this valve assembly open forwardly of the assembly. A first control valve assembly for the hydraulic lift cylinder is mounted on an outer side surface of the cylinder case and is adapted to be supplied with fluid through the second control valve assembly and through fluid passages in the cylinder case and cylinder head. Because the position of the fluid inlet port formed in the cylinder head is kept unchanged even when the number of actuator-control valves in the second control valve assembly is varied, there is no need for changing the fluid piping between this port and the pump. The fluid output ports, which open forwardly of the second control valve assembly, permits an easy fluid piping operation for the plural hydraulic actuators irrespective of the arrangement of seat at a location above the cylinder case.

However, the structure shown in each of U.S. Pat. Nos. 4,643,442 and 5,479,845 that a second control valve assembly for plural hydraulic actuators is mounted on a front surface of the cylinder head of the cylinder case for the hydraulic lift cylinder, particularly the structure shown in the former U.S. patent that the second control valve assembly is constructed as a stack valve having a relatively large axial width or the structure shown in the latter U.S. patent that fluid pipes are further arranged in front of the second control valve assembly, is never preferred in a small-sized working vehicle which is designed to have a compact axial or longitudinal width. When a space in front of the cylinder case is used for the fluid supply assembly in such a small-sized working vehicle, the axial width of a free space between the seat and a steering column arranged before the seat and, therefore, the effective axial width of a step disposed on an outer side surface of the vehicle body at an axial location between the seat and the steering column are largely reduced, which will make it hard for an operator to get on and off the vehicle. Further, because the operator must be seated with his one leg stretched largely forwards for keeping it on the step, comfortability in riding is lessened.

A hydraulic lift cylinder is usually associated with a stop valve for selectively keeping the cylinder in its stopped condition, and such a stop valve is generally disposed within the cylinder head of the cylinder case such that it extends axially of the vehicle with an operating end located before the front end face of the cylinder head, as shown in the aforecited JP, U No. 52-104803 and JP, Y2 No. 1-42970. Such arrangement of a stop valve cannot be adopted in the structure in which a second control valve assembly for plural hydraulic actuators is mounted on a front surface of the cylinder head. In each of the fluid supply assemblies shown in the above-referenced two U.S. patents, a stop valve is disposed within the cylinder head such that it extends laterally of the vehicle, and, for directing an operating portion for this valve axially of the vehicle for an easy operation of the valve, a complicated valve operating mechanism is provided which comprises a curved pipe and a series of balls disposed within the pipe.

Accordingly, a primary object of the present invention is to provide a novel fluid supply system, having a first control valve assembly for controlling the operation of a hydraulic lift cylinder mounted on a cylinder case thereof, in which a second control valve assembly for controlling the operation of plural another hydraulic actuators is mounted on the cylinder case such that the second valve assembly can be disposed within the axial width of the cylinder case and such that assembling and piping can be accomplished easily.

An attendant object of the invention is to provide a fluid supply assembly which includes a minimum number of internal fluid pipings so as to save time for assembling the supply assembly and to reduce the size of it.

A further attendant object of the invention is to provide a fluid supply assembly in which a stop valve for selectively keeping the hydraulic lift cylinder in its stopped condition is disposed within a cylinder head of the cylinder case such that the stop valve extends generally axially of the vehicle whereby the valve can be operated by means of a simple operating mechanism.

A still further attendant object is to provide a fluid supply assembly in which a control mechanism for the second control valve assembly is provided such that it does not require an excessive space in the axial direction of the vehicle whereby easy getting-on and getting-off and riding comfortability with respect to the vehicle are assured.

SUMMARY OF THE INVENTION

The present invention relates to a fluid supply assembly for use in a working vehicle which comprises: a hydraulic lift cylinder (14) for lifting and lowering an auxiliary implement to be connected liftably to the vehicle, a single hydraulic pump (23) for supplying fluid to the hydraulic lift cylinder and to plural another hydraulic actuators (18, 19) employed in the vehicle, a first control valve assembly (15) for controlling the operation of the hydraulic lift cylinder, and a second control valve assembly (20) for controlling the operation of the hydraulic actuators. The hydraulic lift cylinder (14) has a cylinder case (13) on which the first control valve assembly (15) is mounted. The second control valve assembly (20) is adapted such that fluid is supplied to the first control valve assembly (15) through the second control valve assembly.

According to the present invention, the cylinder case (13) includes, in one of its side surfaces, a generally vertical seating surface (52) on which a valve case (53) for the second control valve assembly (20) is mounted. Plural control valves (31, 32) for controlling the supply of fluid to the plural hydraulic actuators (18, 19) are composed of plural spools which are arranged in the valve case (53) such that these spools extend axially of the vehicle at levels different from one another. A fluid inlet port (26) for the second control valve assembly (20), a fluid outlet port (27) for conducting fluid from the second control valve assembly towards the first control valve assembly (15), and a fluid drain port (30) for the second control valve assembly are formed in the valve case (53) such that at least the fluid outlet port and the fluid drain port open at the seating surface (52). Further, fluid output ports (28A, 28B, 29A, 29B) for connecting the second control valve assembly (20) to the hydraulic actuators (18, 19) are formed in the valve case (53) such that these fluid output ports open at an outer side surface of the valve case.

The second control valve assembly (20) having a valve case (53), which includes plural valve spools (31, 32) extending axially of the vehicle and which is mounted on a seating surface (52) formed in an outer side surface of the cylinder case of the hydraulic lift cylinder, can be arranged on the cylinder case within the axial width thereof without any difficulty. Nevertheless, the lateral width of this second control valve assembly (20) or the valve case (53) thereof can be satisfactorily small, because the seating surface (52) is generally vertical, because a single valve case (53) is employed, and particularly because the plural valve spools (31, 32) extending axially of the vehicle are arranged in the valve case at levels different from one another so that they are separated from one another in the vertical direction. Thus, although a wheel fender is generally arranged at an outside location of the cylinder case (53), interval between the wheel fender and the second control valve assembly is kept large. Such large interval permits not only an easy assembling of the control valve assembly but an easy piping operation for connecting fluid-supply pipes for the plural hydraulic actuators (18, 19) to the fluid output ports (28A, 28B, 29A, 29B) which open at an outer side surface of the valve case (53). Fluid passages to be connected respectively to the fluid outlet port (27) and the fluid drain port (30), which open at the seating surface (52), can be formed in the cylinder case (13) such that they open also at the seating surface correspondingly, so that these ports can be connected to the corresponding fluid passages simultaneously when the second control valve assembly is mounted on the seating surface. Such connection without internal piping contributes to the easiness of assembling.

Inlet port for the second control valve assembly (20) can be formed in the valve case (53) such that this port opens at an outer surface of the case. However, in order to eliminate a need for changing the pumped fluid-supply piping even when the design of the second control valve assembly is varied such that the number of the control valves thereof is varied, it is preferred that the fluid inlet port (26) is formed in the valve case (53) such that this port opens also at the seating surface (52), while the cylinder case (13) includes a pump port (24) to be connected to the hydraulic pump (23), and that the inlet port and the pump port are connected to each other through a fluid passage (58, 61) in the cylinder case. The fluid passage (58, 61) in the cylinder case can be formed so as to open at the seating surface (52) and to thereby permit a direct connection thereof to the inlet port (26) without any internal piping. The pump port (24) in the cylinder case is kept in a same position even when the design of the second control valve assembly is varied, so that this pump port will keep the pumped fluid-supply piping unchanged. This pump port can be formed in a cylinder head (13a) of the cylinder case (13) such that the pump port opens at an outer end surface of the cylinder head. Such arrangement of the pump port permits formation of this port and fluid passage communicating therewith in the cylinder head and case as a straight passage bore which can easily be machined or otherwise formed.

In the arrangement of fluid inlet port (26), outlet port (27) and drain port (30) set forth above, it is preferred that the valve case (53) includes, in its joint surface (53a) in abutment on the seating surface (52), a sealed surface area which is enclosed by an endless sealing member (54), and that the above-referenced three ports (26, 27, 30) open respectively at the sealed surface area. According to this arrangement, the endless sealing member functions as a single sealing means between the cylinder case (13) and the valve case (53), so that assembling can be accomplished more easily. Each of the ports opening at the sealed surface area may be shaped in any configuration, such as an elongated recess-shaped one, in response to the arrangement of fluid passages communicated therewith within the valve case.

A part of the vehicle body of a working vehicle, such as a tractor, is generally constituted by a transmission casing for housing a transmission mechanism. Such a transmission casing often includes, in its top wall, an opening for incorporating various transmission elements, such as gears, into the transmission casing. In an embodiment of the present invention, the cylinder case (13) is mounted on an upper surface of a transmission casing (7), which constitutes a part of the vehicle body, such that an opening (7a) in a top wall of the transmission casing is closed by the cylinder case, and a fluid passage (60) is formed in the cylinder case for communicating the fluid drain port (30) to an inside of the transmission casing through the opening (7a). According to this structure, the cylinder case (13) functions also as a cover for closing the opening (7a) in the top wall of the transmission casing. Further, fluid or oil drained from the second control valve assembly (20) is returned into the transmission casing (7), which reserves oil in its lower portion, through a simple fluid path including the opening (7a) such that lubrication of the gears and another transmission elements is effected by the returning oil.

The first control valve assembly (15) may be mounted on the cylinder case (13) at its upper surface or an outer side surface opposite to the side surface in which the seating surface (52) is formed. However, for further simplifying the fluid path in the structure in which the cylinder case (13) is mounted on an upper surface of the transmission casing (7) in the manner set forth above, it is preferred that the first control valve assembly (15) is mounted on a lower surface of the cylinder case (13) such that the first control valve assembly extends into the transmission casing (7) through the opening (7a), and that a fluid passage (59) is formed in the cylinder case for connoting the fluid outlet port (27) to the first control valve assembly (15). The fluid passage (59), formed in the cylinder case (13) for connecting between the second control valve assembly (20) on a side surface of the case (13) and the first control valve assembly (15) on a lower surface of the case, is satisfactorily short in length. Fluid or oil drained from the first control valve assembly (15) can be returned directly into the transmission casing (7) such that lubrication of the gears and another transmission elements is effected by the returning oil.

In the fluid supply assembly according to the present invention, the front surface of cylinder head (13a) of the cylinder case (13) is not used for providing the second control valve assembly (20). Therefore, a stop valve for selectively keeping the hydraulic lift cylinder (14) in its stopped condition can be disposed in the cylinder head (13a) in a simple and easily operational manner such that the stop valve extends generally axially of the vehicle. Thus, in one embodiment of the present invention, the cylinder case (13) includes a fluid passage (75, 76) for conducting fluid from the first control valve assembly (15) to the hydraulic lift cylinder (14), and a stop valve (43) for selectively blocking this fluid passage (75, 76) is disposed in a cylinder head (13a) of the cylinder case such that the stop valve extends generally axially of the vehicle and has an operating portion (86a) at an outside of an outer end surface of the cylinder head. This stop valve (43) is operable to keep the hydraulic lift cylinder (14) in its stopped condition by blocking the fluid passage (75, 76).

A directional control valve as a control valve for controlling the operation of a hydraulic actuator is sometimes associated with a check valve which prevents a backflow of fluid from the side of the actuator during a displacing operation of the control valve. In another embodiment of the present invention, two of the control valves (31, 32) are associated respectively with check valves (34, 35), which allow the flow of fluid only from said fluid inlet port (26) towards the two control valves, such that one of the check valves is inserted in the valve case (53) from an upper side of this case while the other check valve is inserted in the valve case from a lower side of this case. Such arrangement of the two check valves (34, 34) permits accommodation of these valves within the valve case (53) without a need of enlarging the lateral width of this case, so that the advantages owing to a small lateral width of the valve case can be maintained in spite of the employment of two check valves.

It would be desirable if end openings of the fluid output ports (28A, 28B, 29A, 29B), which open at an outer side surface of the valve case (53), could be directed towards any desired direction depending upon the arrangement of the hydraulic actuators such that fluid pipings for connecting such end openings to the actuators can be arranged easily. Thus, in an embodiment of the present invention, the fluid output ports (28A, 28B, 29A, 29B) are associated with adjustable pipe-fittings (28a, 28b, 29a, 29b) for varying the directions of end openings or the fluid outlet ports.

In one embodiment of the present invention, at least two of the plural control valves (31,32) include operating ends (31a, 32a) extending outwardly of the valve case (53) towards a front end of a seat (10) which is disposed at a location above the cylinder case (13), and these two control valves are adapted to be displacingly operated by a control mechanism (96) which is arranged at a laterally outside location below a front end portion of the seat. Such a valve-controlling mechanism for the second control valve assembly can be arranged such that it does not exceed the frontmost end position of the seat, so that the easiness of getting-on and getting-off and riding comfortability with respect to the vehicle are assured.

In an additional embodiment of the invention, the control mechanism (96) is adapted to be operated by a single control lever (95) and to be operable to displace the two control valves (31,32) selectively one at a time or simultaneously. In some cases, related two hydraulic actuators, such as bucket-lifting cylinder and bucket-tilting cylinder provided in a front loader, are desired to be operated simultaneously for attaining a certain working condition promptly and thereby enhancing working efficiency. The control mechanism set forth above permits such prompt attainment of a certain working condition not by a simultaneous operation of two control levers but by the operation of a single control lever.

BRIEF DESCRIPTION OF THE DRAWINGS

The present invention and its attendant advantages will become more readily apparent as the specification is considered in conjunction with the accompanying drawings in which.

DESCRIPTION OF A PREFERRED EMBODIMENT

Figure 1:
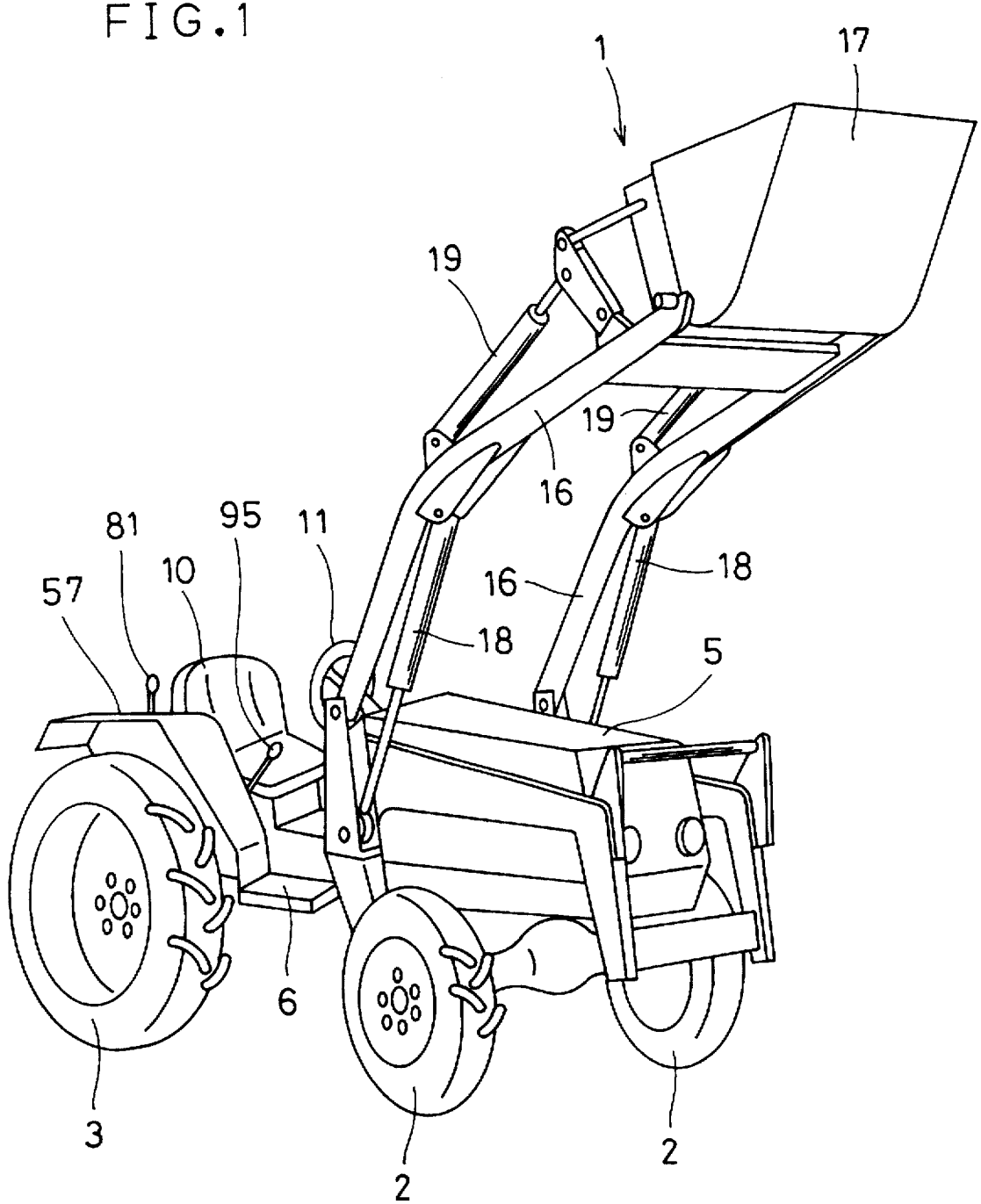
FIG. 1 is a schematic perspective view of a working vehicle in which a preferred embodiment of the fluid supply assembly according to the present invention is employed.

In FIG. 1, there is shown a tractor-type working vehicle which is equipped with a front loader 1 and in which a preferred embodiment of the fluid supply assembly according to the present invention is employed. The vehicle has pairs of left and right front wheels 2 and rear wheels 3. An engine 4 (schematically shown in FIG. 5), as a drive source, is mounted on a front end portion of the vehicle and is covered by an engine hood 5.

Figure 2:
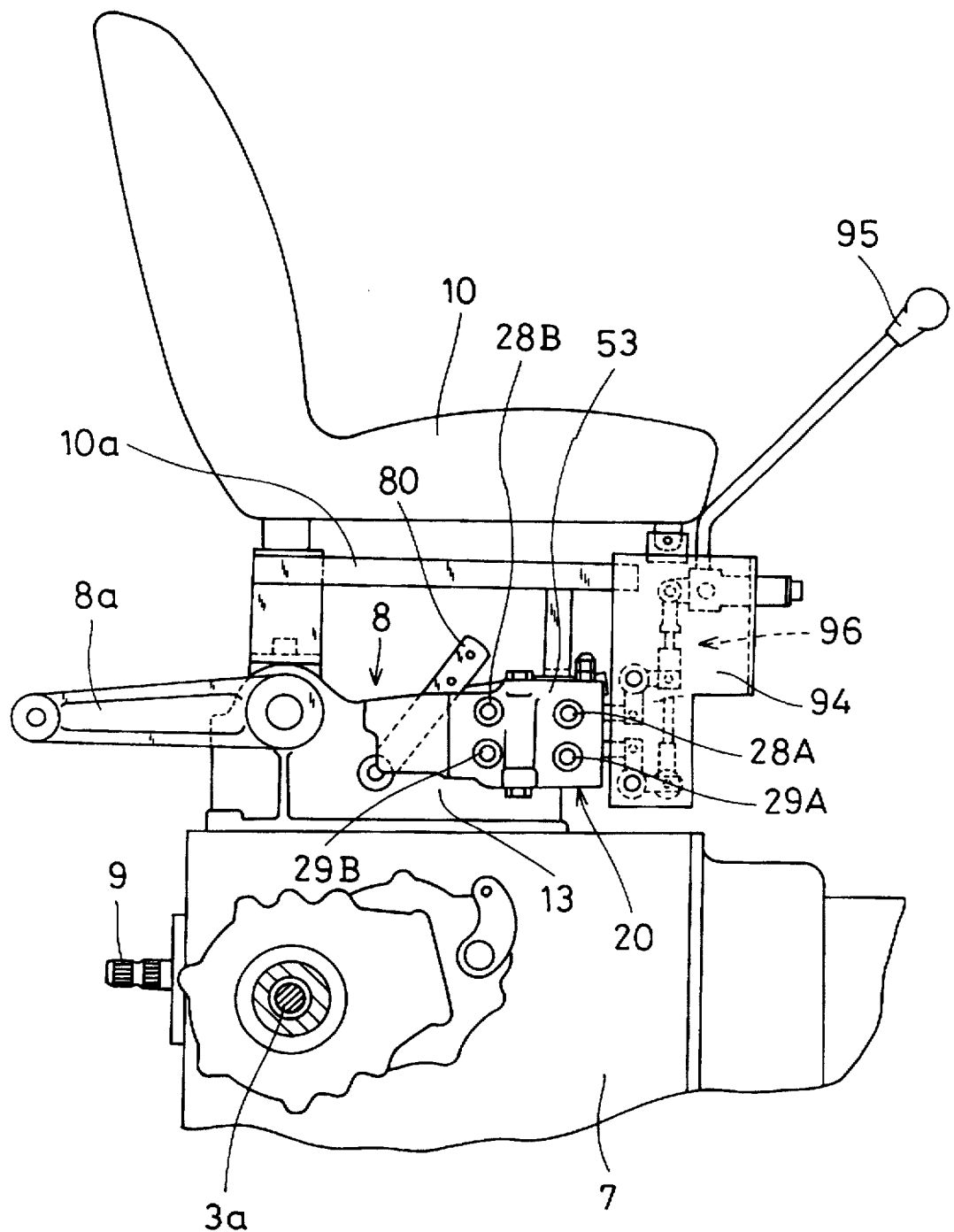
FIG. 2 is a side view, partially in section, of a part of the vehicle shown in FIG. 1.

As shown in FIGS. 1 and 2, a transmission casing 7 is arranged between left and right rear wheels 3 and it forms a part of the vehicle body. The power of engine is conducted into the transmission casing 7, which supports left and right rear wheel axles 3a, so that the vehicle is moved to run by the drive of the left and right rear wheels 3. On an upper surface of the transmission casing 7, a hydraulic lift mechanism 8, having left and right lift arms 8a, is mounted for lifting and lowering an auxiliary implement such as a rotary tiller (not shown), to be drawn by the vehicle, between a lower operative position and an upper rest position. For driving the auxiliary implement, a PTO (power take-off) shaft 9 is provided and it extends rearwardly from the transmission casing 7. A seat 10 is arranged at a location above the transmission casing 7, and a steering wheel 11 is arranged at a location before the seat 10. The vehicle is steered by operating the steering wheel 11 so as to turn the left and right front wheels 2. In FIG. 1, numeral 6 designates a step of one side which is fixedly attached to the vehicle body.

Figure 3:
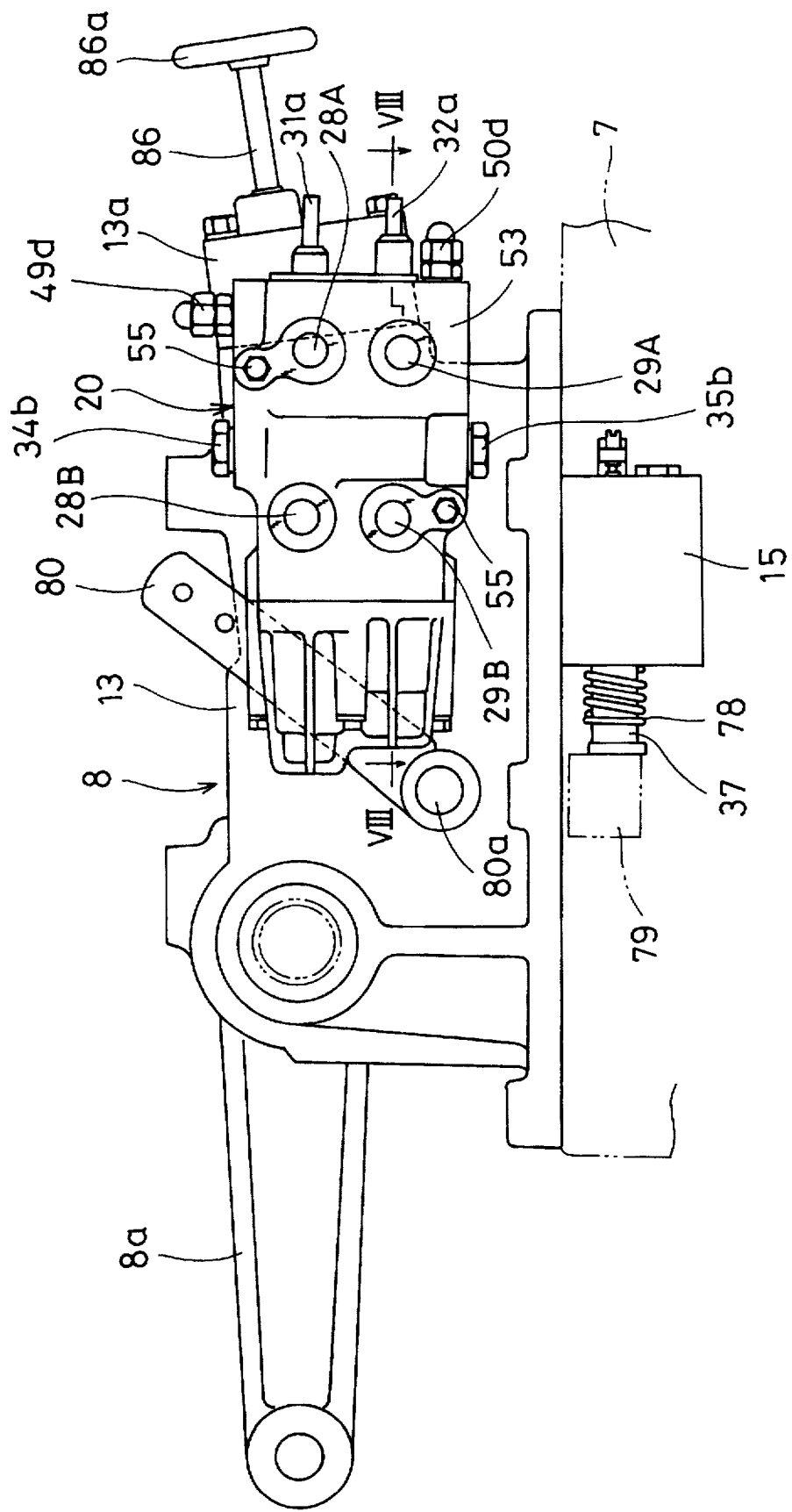
FIG. 3 is a side view, partially omitted, showing a hydraulic lift mechanism and second control valve assembly shown in FIG. 2 as well as a first control valve assembly disposed within a transmission casing shown in FIGS. 1 and 2.
Figure 4:
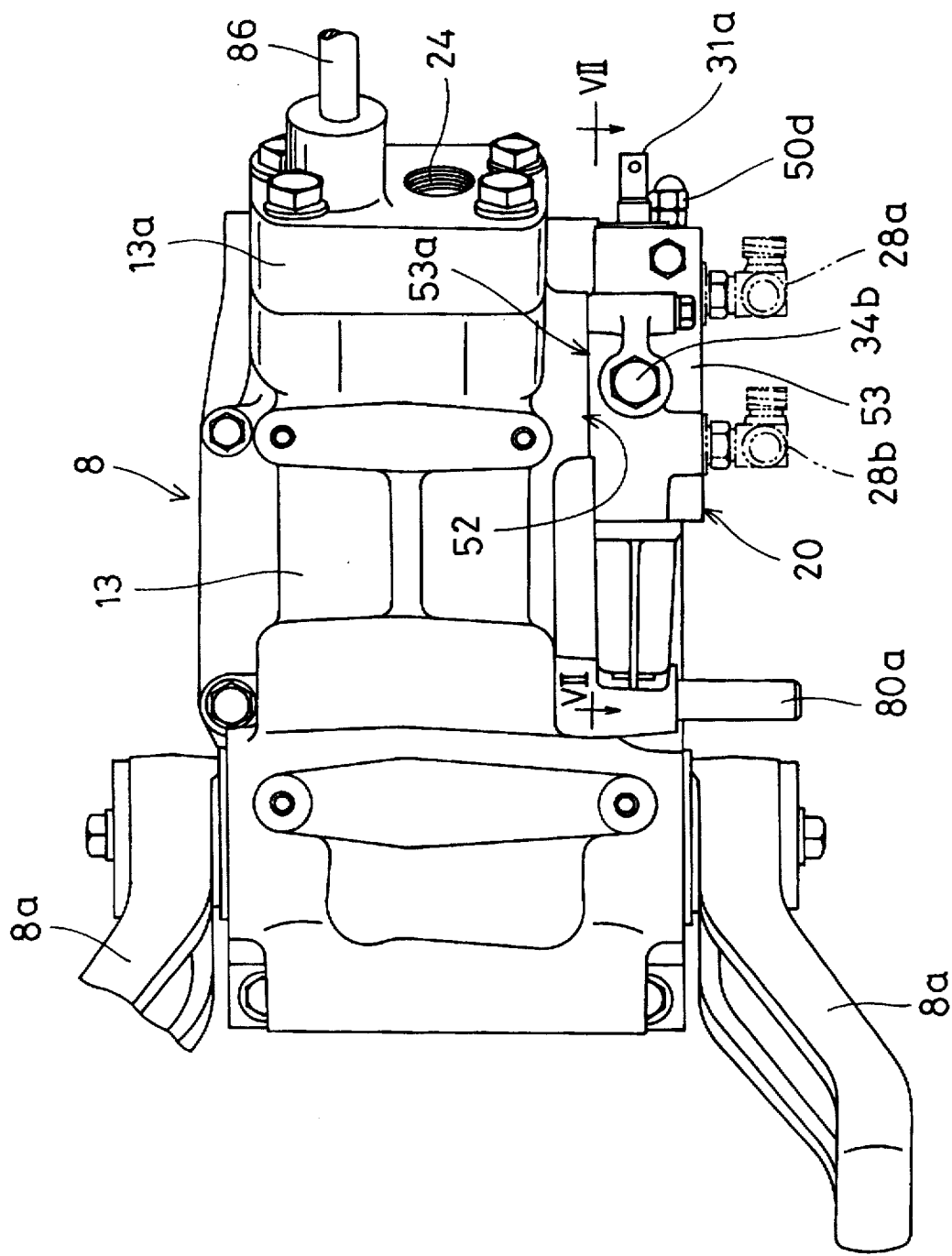
FIG. 4 is a plane view showing the hydraulic lift mechanism and second control assembly shown in FIGS. 2 and 3.
Figure 5:
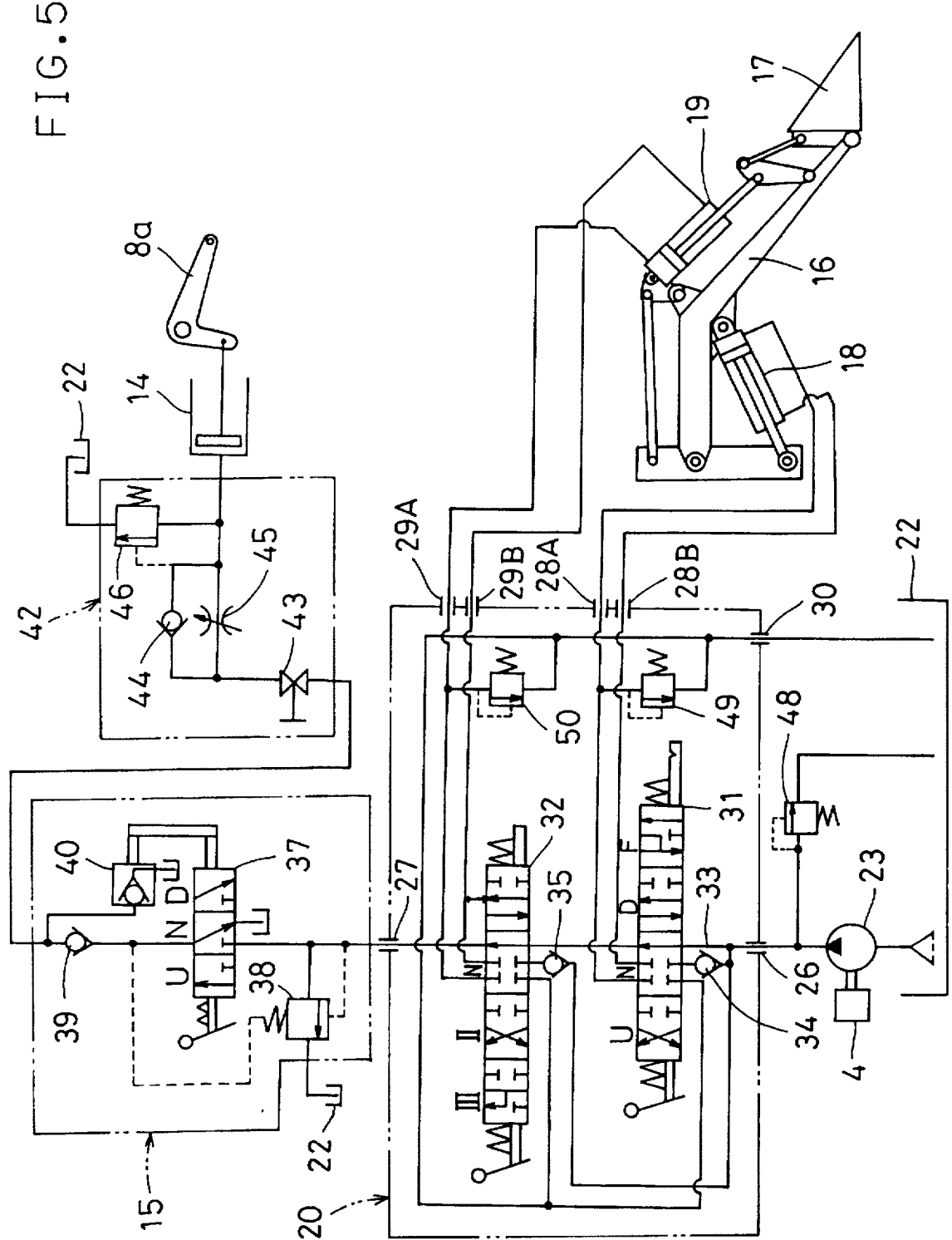
FIG. 5 is a circuit diagram showing a fluid circuit employed in the vehicle.

The hydraulic lift mechanism 8 comprises a hydraulic lift cylinder 14, shown in FIG. 5, having a cylinder case 13 which is fixedly mounted on an upper surface of the transmission casing 7, as shown in FIGS. 2 to 4. A stay 10a for supporting the seat 10 is secured to an upper surface of the cylinder case 13. As shown in FIG. 3, a first control valve assembly 15 for controlling the supply of fluid to the lift cylinder 14 is fixedly mounted on a lower surface of the cylinder case 13 and is disposed in an upper portion within the transmission casing 7.

As shown in FIG. 1, the front loader I comprises a pair of left and right lift arms 16, which are rockably supported by the vehicle body, and a bucket 17 which is tiltably supported by the ends of lift arms 16. As is usual, a pair of left and right lift cylinders 18 are arranged between the vehicle body and the lift arms 16 for lifting and lowering the bucket 17, and a pair of left and right tilt cylinders 19 are arranged between the lift arms 16 and the bucket 17 through links for tilting the bucket. A second control valve assembly 20 for controlling the supply of fluid to these cylinders 18 and 19 is fixedly mounted, as shown in FIGS. 2 to 4, on an outer side surface of the cylinder case 13 at a front half of this case.

Fluid to be supplied to cylinders 14, 18 and 19 is reserved within a lower portion of the transmission casing 7 using this casing also as a fluid reservoir or tank 22 shown in FIG. 5. A single hydraulic pump 23, driven by engine 4, is employed for supplying fluid from the tank 22. As shown in FIG. 4, a cylinder head 13a, which is secured to a front end of the cylinder case 13, includes a pump port 24 which opens towards the front. Fluid discharged from the hydraulic pump 23 is adapted to be fed to the pump port 24 through a fluid feeding pipe (not shown) and, then, is supplied to the cylinders 14, 18 and 19 through the first and second control valve assemblies 15 and 20.

As shown in FIG. 5, the second control valve assembly 20 comprises a fluid inlet port 26 which is connected to the pump port 24 (FIG. 4), a fluid outlet port 27 which is connected to the first control valve assembly 15, a pair of fluid output ports 28A and 28B which are connected to each of the lift cylinders 18, a pair of fluid output ports 29A and 29B which are connected to each of the tilt cylinders 19, and a fluid drain port 30 which is connected to the fluid tank 22. This second control valve assembly 20 includes two directional control valves 31 and 32. Of these control valves, control valve 31 is operative to control the supply of fluid to each of the lift cylinders 18 while control valve 32 is operable to control the supply of fluid to each of the tilt cylinders 19. The second control valve assembly 20 is adapted such that, when both of the control valves 31 and 32 are in their neutral positions N shown, the inlet port 26 is communicated to the outlet port 27 through a fluid supply passage 33 passing through the control valves 31 and 32 of the neutral positions so that fluid is supplied to the first control valve assembly 15.

Each of the control valves 31 and 32 or its inlet port is connected to the fluid supply passage 33 through a check valve 34 or 35 for preventing the backflow of fluid towards the passage 33. Control valve 31 has a neutral position N where both of the fluid output ports 28A and 28B are kept in a blocked condition, a lifting position U where each lift cylinder 18 is extended so as to lift the bucket 17, a lowering position D where each lift cylinder 18 is contracted so as to lower the bucket 17, and a floating position F where fluid is drained from both fluid chambers in each lift cylinder 18 so that the lift arms 16 are in a floating condition at their lowered positions. Control valve 32 has a neutral position N where both of the fluid output ports 29A and 29B are kept in a blocked condition, a tilting position I where each tilt cylinder 19 is contracted so as to tilt the bucket 17, a dumping position II where each tilt cylinder 19 is extended so as to provide a dumping movement to the bucket 17, and a quick dumping position III where fluid returned from the contracting fluid chamber in each tilt cylinder 17 is also supplied to the extending fluid chamber in this cylinder so as to quickly extend the tilt cylinder and to thereby provide a quick dumping movement to bucket 17.

As also shown in FIG. 5 and as is usual, the first control valve assembly 15 comprises a directional control valve 37 for controlling the supply of fluid to the hydraulic lift cylinder 14, an unloader valve 38 for unloading fluid supplied under pressure from the pump 23 at a low pressure at the neutral position N and implement-lowering position D of the control valve 37, a load check valve 39 which is kept in its closed condition at the neutral and lowering positions N and D of the control valve 37 so as to prevent the backflow of fluid from the hydraulic lift cylinder 14 and is placed in its open condition when the control valve 37 is displaced to its implement-lifting position U, and an unloader check valve 40 which is adapted to be placed in its open condition in response to the displacement of the control valve 37 to the lowering position D so as to permit a quick drainage of fluid from the hydraulic lift cylinder 14.

A final valve mechanism 42 is disposed between the first control valve assembly 15 and the hydraulic lift cylinder 14. This valve mechanism 42 comprises a stop valve 43 for selectively stopping the supply and drainage of fluid in respect to the hydraulic lift cylinder 14 and thereby keeping this cylinder in a stopped condition, slow-return valve means including a check valve 44 for a quick supply of fluid to the cylinder 14 and an adjustable area throttle 45 connected in parallel with the check valve 44 for a slow drainage of fluid from the cylinder 14, and an overload-relief valve 46 for avoiding application of an excessive fluid pressure to the cylinder 14.

As also shown in FIG. 5, a relief valve 48 is connected to the fluid discharge path of pump 23 such that it is operable to determine fluid pressure in the fluid supply passage 33. In the second control valve assembly 20, there are provided a relief valve 49, which is incorporated in a fluid path connected to the extending fluid chamber in each lift cylinder 18, and another relief valve 50 which is incorporated in a fluid path connected to the extending fluid chamber in each tilt cylinder 19. These relief valves 49 and 50 are each operable to relieve a suddenly caused abnormal high fluid pressure and to thereby protect the front loader system. For example, the relief valve 49 will operate to relieve a high fluid pressure which may suddenly be caused in the extending fluid chamber in each lift cylinder 18 when the control valve 31 is quickly returned from the implement-lowering position D to the neutral position N whereby drainage of fluid from the extending fluid chamber is suddenly interrupted. Similarly, the relief valve 50 will operate to relieve a high fluid pressure which may suddenly be caused in the extending fluid chamber in each tilt cylinder 19 to urge the bucket to tilt when the bucket 17 in its lowered position meets with an obstacle in a condition where the vehicle is moved forward and the bucket 17 is scooping earth and sand from the ground at the floating position F of control valve 31.

Figure 6:
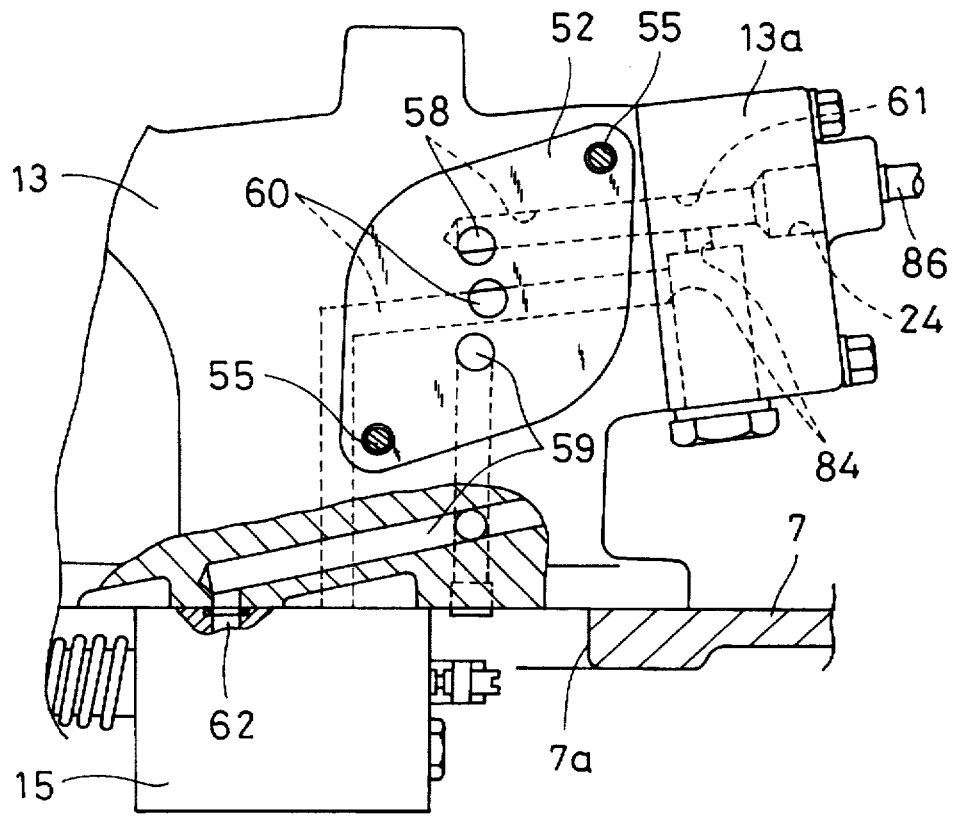
FIG. 6 is a side view, partially in section, showing a front half of the hydraulic lift mechanism and the second control valve assembly in a condition where the second control valve assembly is removed.
Figure 7:
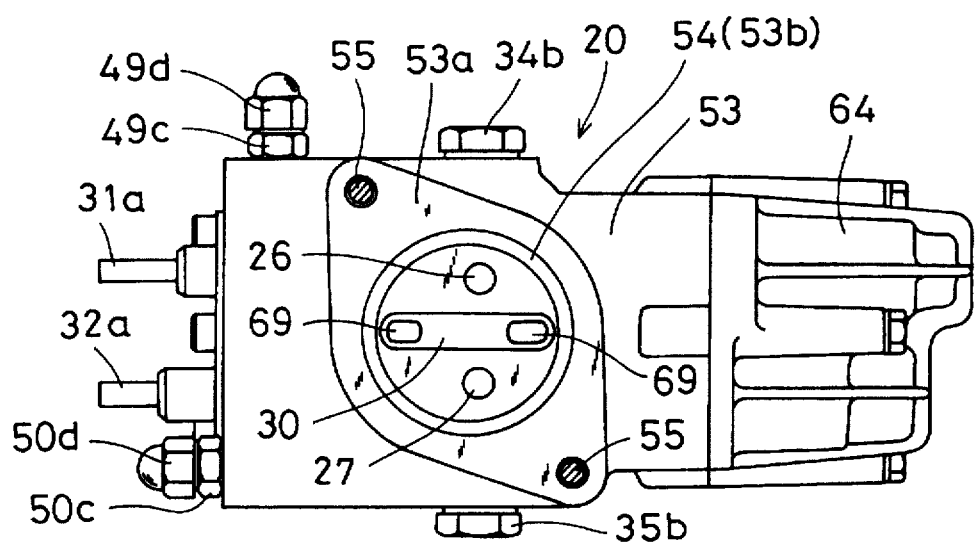
FIG. 7 is a sectional view taken generally along line VII—VII of FIG. 4.
Figure 8:
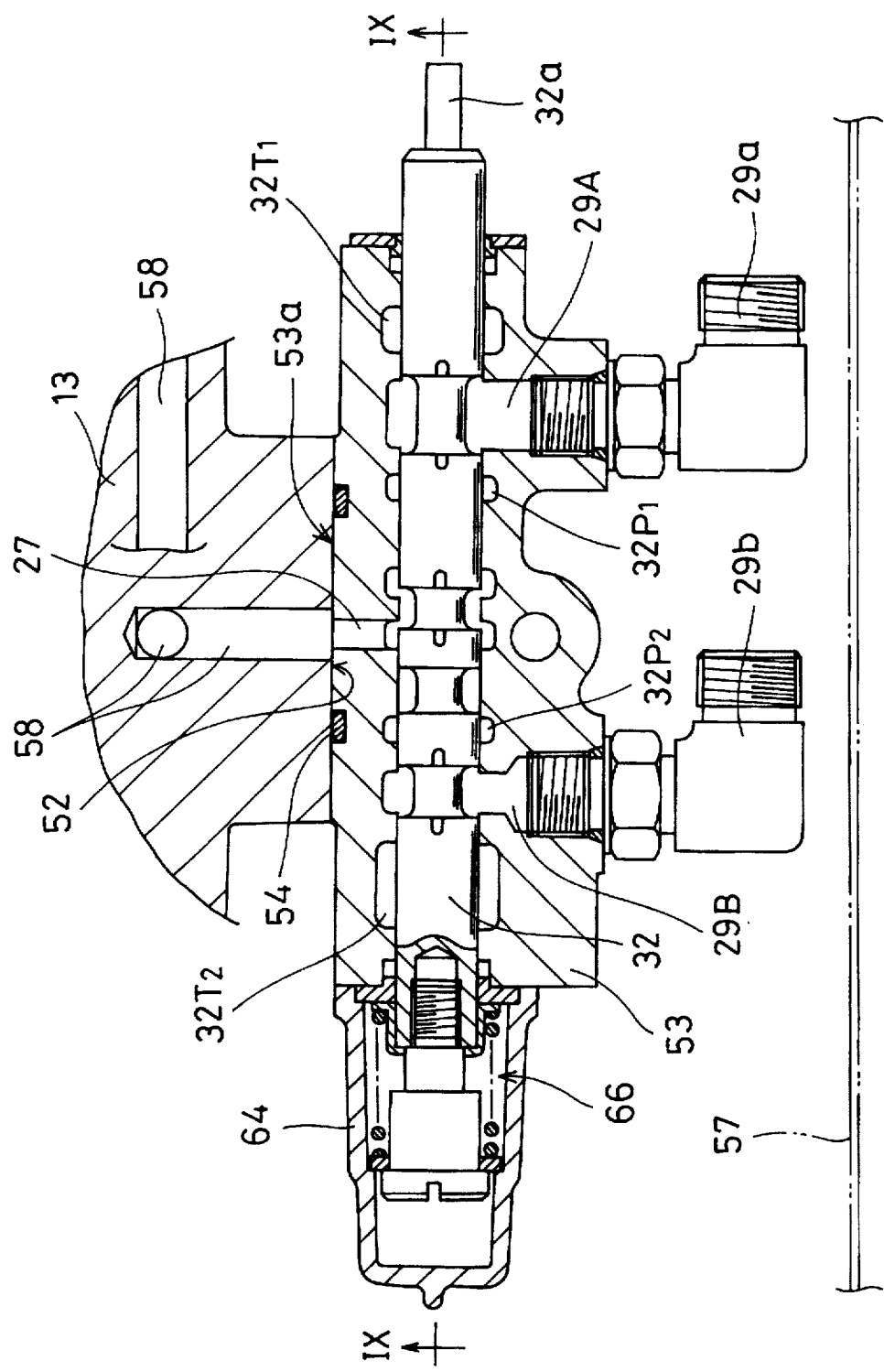
FIG. 8 is a enlarged sectional view taken generally along line VIII—VIII of FIG. 3.

As shown in FIGS. 4 and 6, a generally ellipse-shaped vertical seating surface 52 is formed in an outer surface of a side wall of the cylinder case 13 at a front end portion of this case. As shown in FIGS. 4 and 7, the second control valve assembly 20 comprises a single valve case 53 which is provided, in its inner side surface and at an axially central portion of this case, with a correspondingly shaped vertical joint surface 53a. This joint surface 53a includes therein an annular groove 53b. As shown in FIGS. 6 to 8 and in FIGS. 10 and 11, the valve case 53 is fastened to the cylinder case 13 using a pair of bolts 55 in a condition in which the joint surface 53a is in contact with the seating surface 52 with an endless seal or O-ring 54 fitted in the groove 53b. Consequently, the valve case 53 is mounted, only at its axially central portion, on the outer side surface of the cylinder case 13 so that there remains some clearance, shown at 56 in FIG. 12, between the cases 13 and 53 at location apart from the seating surface 52 and joint surface 53a. In this way, the second control valve assembly 20 is arranged at an inside location of a fender 57 which covers, as shown in FIG. 1, rear wheel 3 of one side at an inside location of this wheel.

Figure 10:
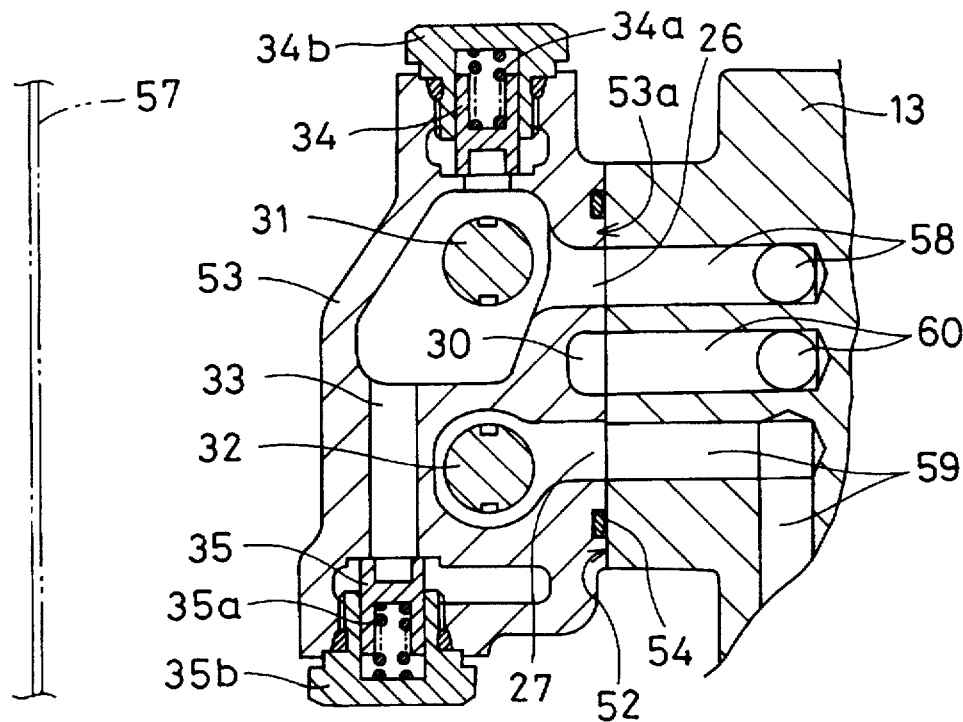
FIG. 10 is a sectional view taken generally along line X—X of FIG. 9.
Figure 12:
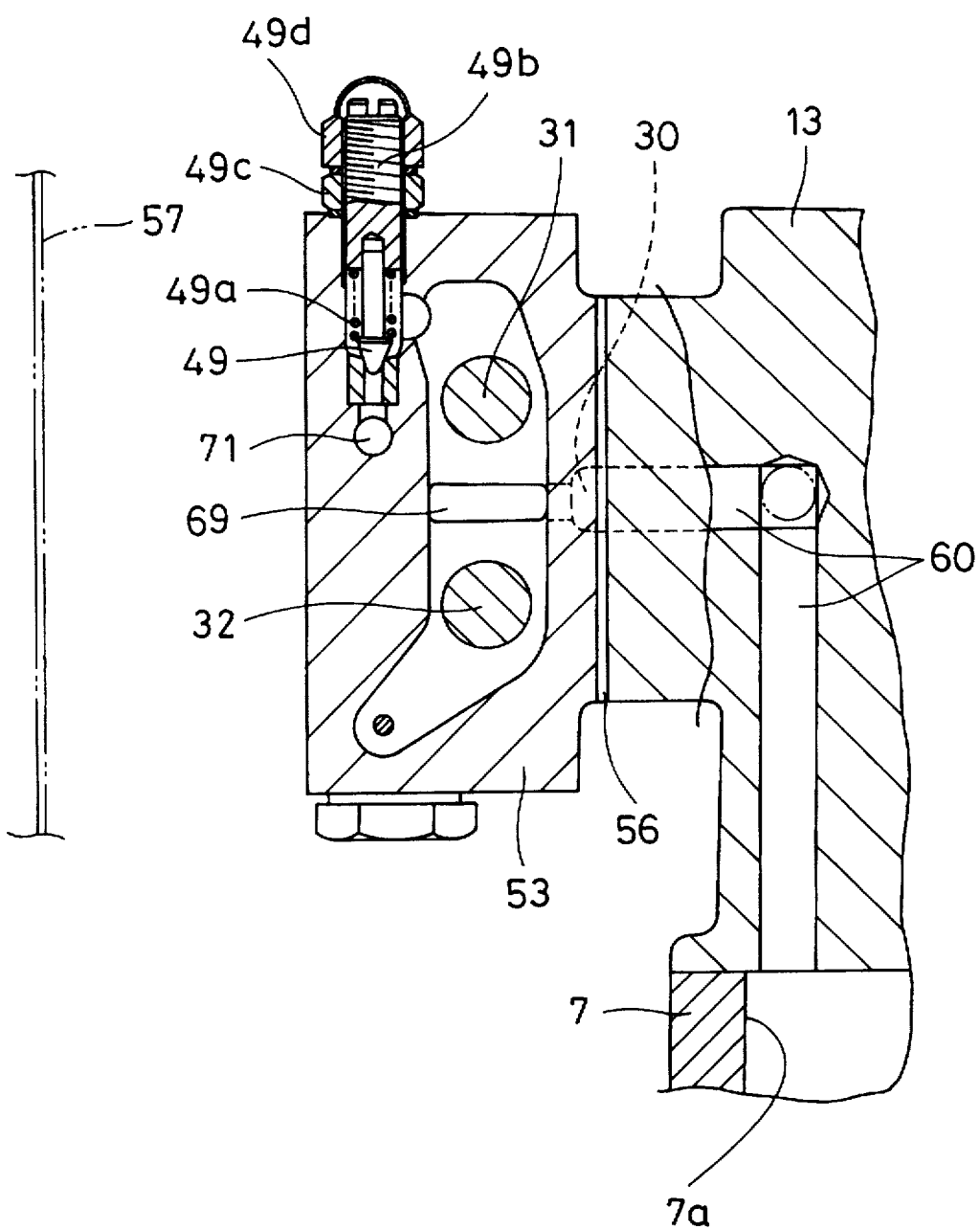
FIG. 12 is a sectional view taken generally along line XII—XII of FIG. 9.

As shown in FIG. 7, the fluid inlet port 26, outlet port 27 and drain port 30, set forth above by referring to FIG. 5, are formed in the valve case 53 such that these ports open at a sealed surface area, enclosed by the O-ring 54, of the joint surface 53a. As shown in FIGS. 6 and 10, corresponding fluid supply passage 58, fluid transfer passage 59 and fluid drain passage 60 are formed in the cylinder case 13 such that these passages 58, 59 and 60 open at the seating surface 52 in an arrangement to communicate directly with the ports 26, 27 and 30. Of these fluid passages, fluid supply passage 58 is communicated, as shown in FIG. 6, to the above-referenced pump port 24 in the cylinder head 13a through a fluid passage 61 in this head. As also shown in FIG. 6, fluid transfer passage 59 includes some bends and has an open end at a lower surface of the cylinder case 13. At such an open end, the transfer passage 59 is communicated to a fluid inlet port 62 of the first control valve assembly 15 which is mounted on the lower surface of cylinder case 13 such that the valve assembly 15 extends into the transmission casing 7 through an opening 7a in a top wall of this casing. Opening 7a is adapted to be used for incorporating therethrough gears and another elements of a transmission mechanism (not shown), which is disposed within the transmission casing 7, into this casing, and the cylinder case 13 is mounted on the casing 7 such that the opening 7a is closed by this case 13. As shown in FIG. 12, fluid drain port 60 has an open end which opens at an inside of the transmission casing 7 through the above-referenced opening 7a.

Figure 9:
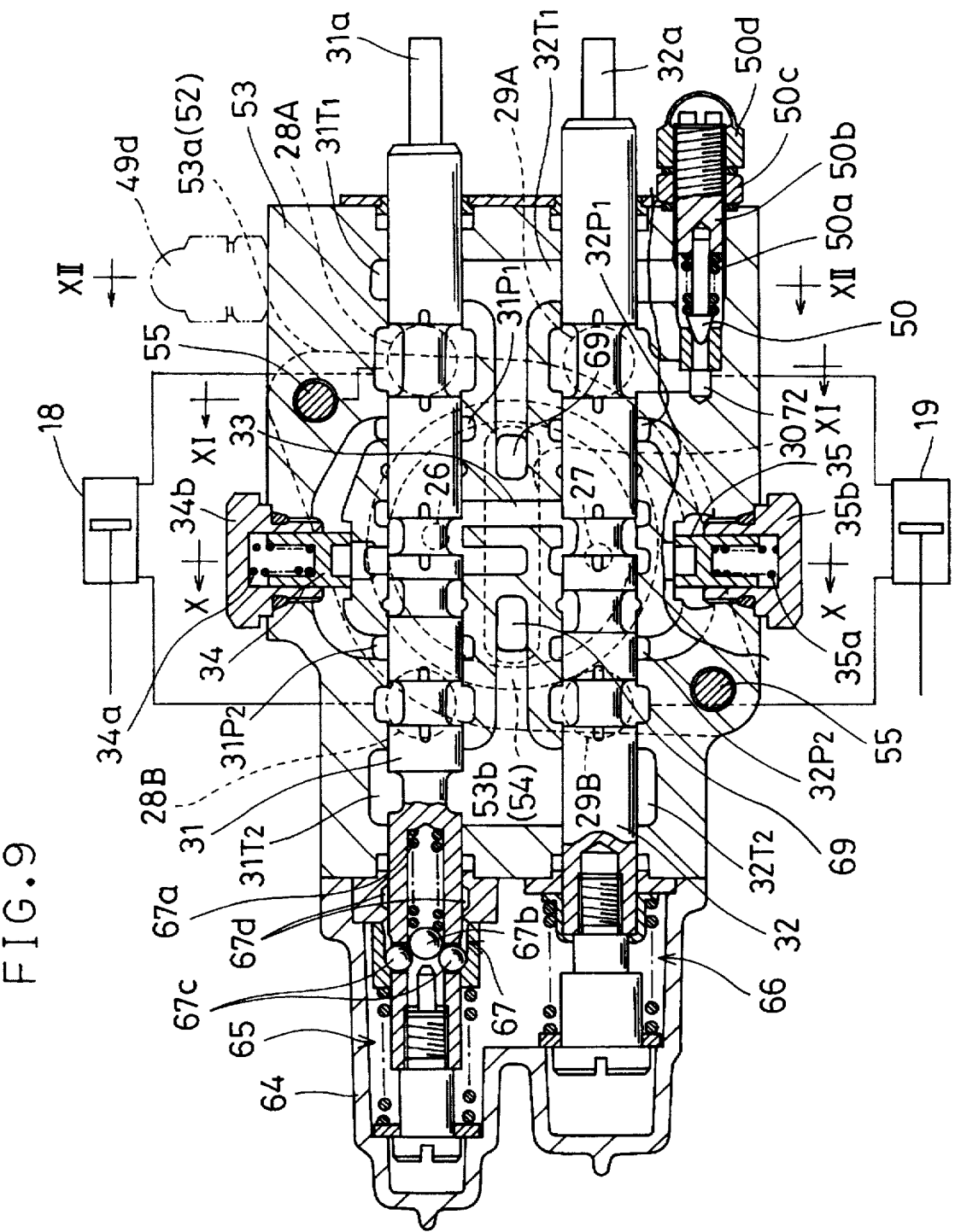
FIG. 9 is a sectional view taken generally along line IX—IX of FIG. 8.
Figure 11:
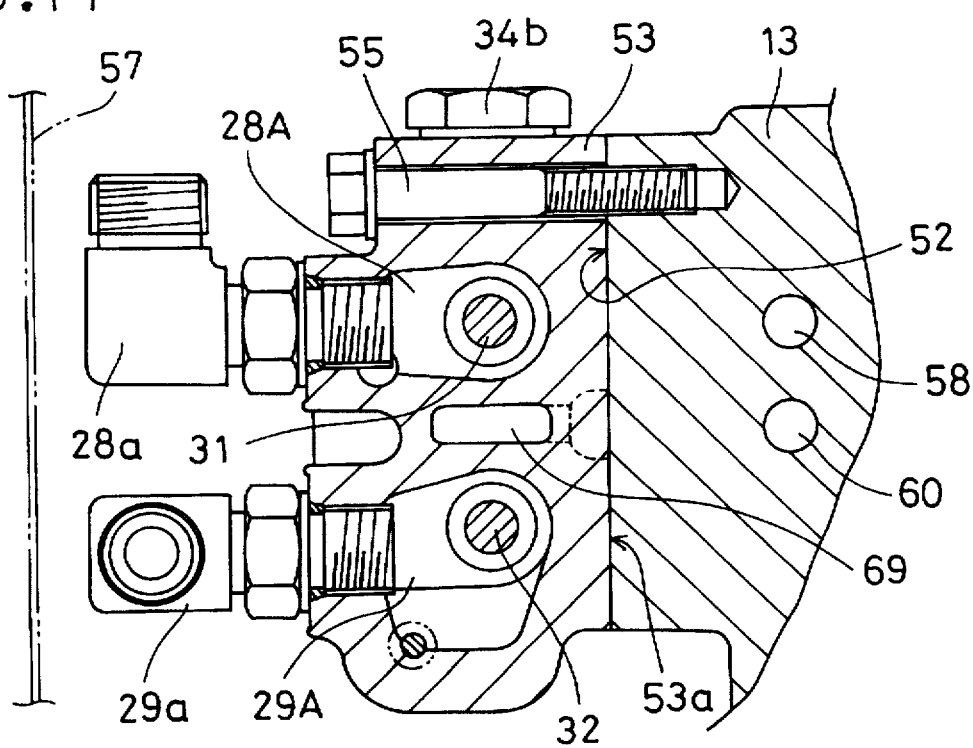
FIG. 11 is a sectional view taken generally along line XI—XI of FIG. 9.

As shown in FIGS. 2 and 3, in FIGS. 8 and 9 and in FIG. 11, the fluid output ports 28A, 28B and 29A, 29B, set forth above by referring to FIG. 5, are formed in the valve case 53 such that ports 28A, 28B and ports 29A, 29B open at an outer side surface of the valve case 53 respectively at a high level and at a low level. To these fluid output ports 28A, 28B and 29A, 29B are attached pipe-fittings 28a, 28b and 29a, 29b (which are omitted in FIGS. 2 and 3) for the connection of respective fluid pipings (not shown) to the lift cylinder 18 and to the tilt cylinder 19. These fittings are each L-shaped and are threadingly engaged with the output ports so that the directions of end openings of the outlet ports can be varied. Thus, as shown in FIGS. 8 and 11, the upper pipe-fittings 28a and 28b can be adjusted so as to direct the end openings of ports 28A and 28B upward, while the lower pipe-fittings 29a and 29b can be adjusted so as to direct the end openings of ports 29A and 29B forward. Alternatively, as shown in phantom in FIG. 4, the upper pipe-fittings 28a and 28b can be adjusted so as to direct the end openings of ports 28A and 28B forward. Each of the fluid outlet ports 28A, 28B, 29A and 29B, which open at the outer side surface of valve case 53, can have an end opening directed towards any optional direction, such as forward, backward, upward, downward or any oblique direction, by adjusting each of the adjustable fitting 28a, 28b, 29a and 29b in response to the arrangement of the hydraulic actuator or cylinder 28 or 29 to which the output port is connected.

The structure of the second control valve assembly 20 will be detailed hereinafter by referring to FIGS. 8 through 12. The directional control valves 31 and 32, set forth above by referring to FIG. 5, are composed of spools, which extend axially of the vehicle, and are arranged in the valve case 53 respectively at a high level and at a low level. These valve spools 31 and 32 have operating ends 31a and 32a which extend forwardly of the valve case 53. Rear ends of the valve spool 31 and 32 extend into a cover member 64 which is secured to a rear surface of the valve case 53. Cover member 64 includes in it spring mechanisms 65 and 66 which are operable to return the valve spools 31 and 32 to their neutral positions shown in FIGS. 8 and 9. Valve spool 31 is associated also with a detent mechanism 67, as shown in FIG. 9, for releaseably retaining the spool 31 in position at its floating position F set forth above by referring to FIG. 5. This detent mechanism 67 comprises a pair of balls 67c which are biased to move radially outwardly by a coil spring 67a through another ball 67b, and a pair of recesses 67d, formed in an annular stationary member within the cover member 64, into which balls 67c project at the floating position of the valve spool 31.

As shown in FIG. 9, the fluid supply passage 33 for connecting between the inlet and outlet ports 26 and 27, set forth above by referring to FIG. 5, extends in a generally vertical direction within the valve case 53. Pairs of axially spaced pump ports $31P_1$, $31P_2$ and $32P_1$, $32P_2$ are faced respectively to the valve spools 31 and 32, and the fluid supply passage 33 is communicated to these pump ports $31P_1$, $31P_2$ and $32P_1$, $32P_2$ respectively through the check valves 34 and 35 set forth above by referring to FIG. 5. As shown in FIGS. 9 and 10, these check valves 34 and 35 are arranged such that one of the check valves 34 is inserted in the valve case 53 from an upper side of this case, while the other check valve 35 is inserted in the case 53 from a lower side thereof. Consequently, an enlargement of the valve case in width, which may be resulted from a parallel arrangement of the check valves, is avoided. In FIGS. 9 and 10, numerals 34a and 35a designate valve springs of the check valves 34 and 35, and numerals 34b and 35b designate threaded plugs which close the check valve-inserting bores at their open ends and which also receive the base ends of valve springs 34a and 35a.

As shown in FIGS. 8 and 9, the fluid supply passage 33 is arranged such that it communicates between the inlet port 26 and the outlet port 27 at the neutral positions of both spools 31 and 32 shown. Pairs of the axially spaced fluid output ports 28A, 28B and 29A, 29B are arranged, as shown in FIGS. 8 and 9 and in FIG. 11, such that they are faced to the valve spools 31 and 32 at locations apart forwards and rearwards from the pump ports $31P_1$, $31P_2$ and $32P_1$, $32P_2$. As shown in FIGS. 8 and 9, pairs of axially spaced tank ports $31T_1$, $31T_2$, and $32T_1$, $32T_2$ are faced to the valve spools 31 and 32 at locations apart forwards and rearwards from the fluid output ports 28A, 28B and 29A, 29B. These tank ports are communicated, at the inside of valve case 53, to the fluid drain port 30 of the second control valve assembly 20, which port is shaped to have a relatively large axial width as shown in FIG. 7, through fluid drain passages 69 which include some bends.

As shown in FIGS. 9 and 12, the relief valves 49 and 50, set forth above by referring to FIG. 5, are inserted in the valve case 53 respectively from an upper side of this case and from a front side of the valve case. These relief valves 49 and 50 are designed such that they are operable to relieve fluid from fluid passages 71 and 72, which are communicated to the fluid output ports 28A and 29A, towards the tank ports $31T_1$ and $32T_2$. In FIGS. 9 and 12, numerals 49a and 50a designate valve springs of the relief valves 49 and 50, numerals 49b and 50b designate threaded rods which guide the valves 49 and 50 and which also receive the base ends of valve springs 49a and 50a, numerals 49c and 50c designate nuts which are fixedly arranged on the valve case 53 for threadingly supporting the rods 49b and 50b, and numerals 49d and 50d designate cap nuts for displacing the rods 49b and 50b and thereby adjusting the biasing force of valve springs 49a and 50a.

Valve spools 31 and 32 comprise respectively lands which are operable in response to the positions of these spools to communicate and block selectively between the ports, having been detailed above, so as to attain the controls of fluid flows set forth above in reference to FIG. 5.

Figure 13:
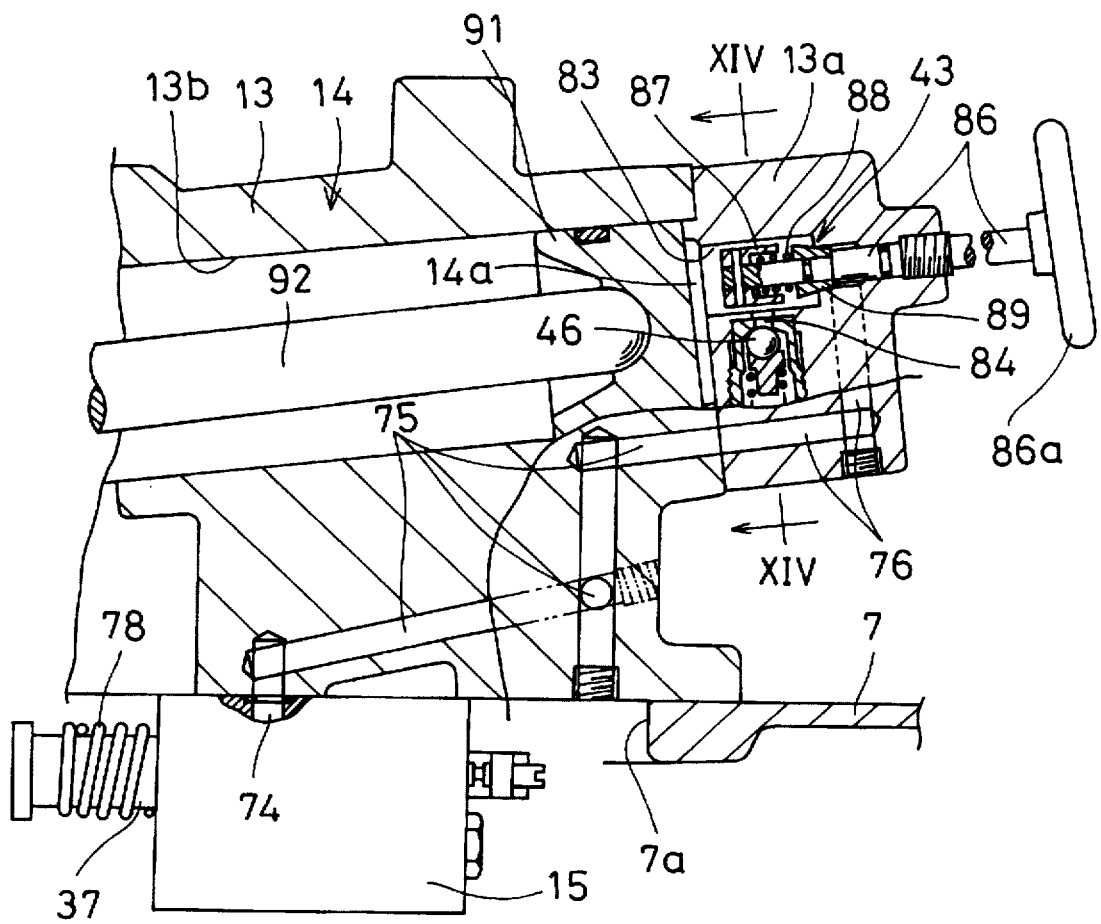
FIG. 13 is a sectional side view showing a front half of the hydraulic lift mechanism together with the first control valve assembly.

As already described by referring to FIG. 6, the second control valve assembly 20 or its fluid outlet port 27 formed in the valve case 53 is communicated to the fluid inlet port 62 of the first control valve assembly 15 through the fluid transfer passage 59 in the valve case. As shown in FIG. 13, the first control valve assembly 15 has a fluid output port 74 which opens, as in the case of inlet port 62, at the lower surface of cylinder case 13. This output port 74 is communicated to a fluid passage 76, formed in the cylinder head 13a, through a fluid passage 75 in the cylinder case 13. The first control valve assembly 15 is of a conventional construction which includes valves 37-10 set forth above by referring to FIG. 5. Spool constituting the above-referenced directional control valve 37 extends rearwardly from the valve assembly 15. Although not shown in the drawings, the fluid drain port of the valve assembly 15 is provided such that this port opens directly at an inside of the transmission casing 7.

As shown in FIGS. 3 and 13, valve spool 37 is biased to move rearwards by a coil spring 78. A position-control link mechanism 79, which is depicted in FIG. 3 as a block in phantom, engages a rear end face of the spool 37. Such a position-control link mechanism is well-known in the art. A link member 80, which is operatively connected to the control link mechanism 79, is supported rotatably about a pivot 80a by the cylinder case 13. Link member 80 is also connected to a lift-control lever 81, which is disposed beside a rear end portion of seat 10 as shown in FIG. 1, and to the lift arm 8a of one side such that, when the valve spool 37 has been displaced by a distance corresponding to the operated amount of lift-control lever 81 so that the lift arms 8a have been rockingly displaced by a corresponding amount, valve spool 37 is automatically returned to its neutral position due to feedback control from the side of lift arm 8a. Such a feedback control mechanism is also well-known in the art. Examples of a link mechanism, corresponding to mechanism 79 shown, and a feedback control mechanism are disclosed in the aforecited U.S. Pat. No. 4,643,442.

Figure 14:
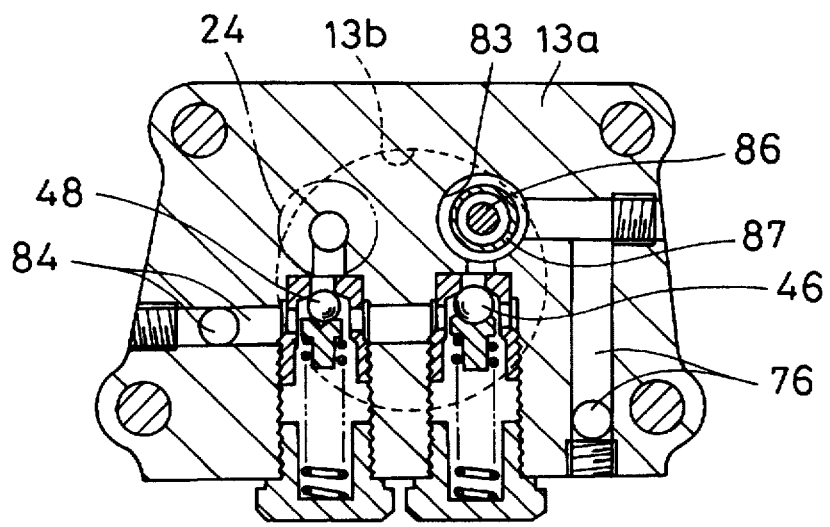
FIG. 14 is a sectional view taken generally along line XIV—XIV of FIG. 13.

The relief valve 48 and final valve mechanism 42, set forth above in reference to FIG. 5, are disposed within the cylinder head 13a, as shown in FIGS. 13 and 14. The above-referenced fluid passage 76, which is communicated to the output port 74 of the first control valve assembly 15, is arranged such that it is communicated to a fluid chamber 14a of the hydraulic lift cylinder 14 through a valve-accommodating bore 83 within the cylinder head 13a. Cylinder head 13a further includes a fluid passage 84 for communicating the above-referenced pump port 24 and valve-accommodating bore 83 to the above-referenced fluid drain passage 69 in the cylinder case 13. The overload relief valve 46 of final valve mechanism 42 and the fluid pressure-determining relief valve 48 are disposed within parallel-arranged vertical bores which are formed in the cylinder head 13a from a lower surface thereof.

A threaded control rod 86, which is threadingly supported by the cylinder head 13a, extends from a front side of head 13a into the valve-accommodating bore 86. A spring-receiving sleeve member 87 is attached to an inner end of the control rod 86. A conical valve member 89 is slidably mounted on the control rod 86 and is biased to move by a coil spring 88, which is received at its base end by the sleeve member 87, such that the valve member 89 engages an annular shoulder at an end of the bore 83. A control handle 86a is attached to an outer end of the control rod 86. The stop valve 43 of final valve mechanism 43 is provided such that it is operable to interrupt fluid communication between the fluid passage 76 and the bore 83 when the control rod 86 is displaced outwardly to the maximum extent by operating the handle 86a so that the valve member 89 is engaged with the above-referenced annular shoulder in a fluid-tight manner under a condition where the valve member 89 is engaged by the sleeve member 87. The check valve 44 is provided such that it is operable to open the fluid path by a retreatment of the valve member 89 against the biasing force of spring 88 under the action of fluid pressure applied to the valve member from the side of fluid passage 76 and such that it is operable to block the fluid path by an engagement of the valve member 89 with the annular shoulder under the action of the biasing force of spring 88 and fluid pressure applied to the valve member from the side of bore 83. The adjustable area throttle 45 is provided by the clearance between the valve member 89 and the annular shoulder and can be adjusted by a displacement of the control rod 86. The stop and slow return valve mechanism having been detailed above is well-known.

In FIGS. 13 and 14, numeral 13b designates a cylinder bore, having a slight backward and downward inclination, which is formed in the cylinder case 13, numeral 91 designates a piston which is slidably fitted in the cylinder bore 13b such that it defines the fluid chamber 14a in cooperation with the cylinder head 13a, and numeral 92 designates a connetor rod which connects operatively between the piston 91 and d rockable arm (not shown) which is disposed in a rear end portion of the cylinder bore 13b for rockingly displacing the lift arms 8a.

As shown in FIG. 2, a support frame 94 is arranged in front of the second control valve assembly 20 and is supported by a front end portion of the seat-supporting stay 10a. The operating ends 31a and 31b of valve spools 31 and 32 extend into this support frame 94 within which there is provided a control mechanism 96 for selectively operating both of the valve spools 31 and 32 by means of a single control lever 95. The control mechanism 96 is depicted in great detail in FIGS. 15 through 18.

Figure 15:
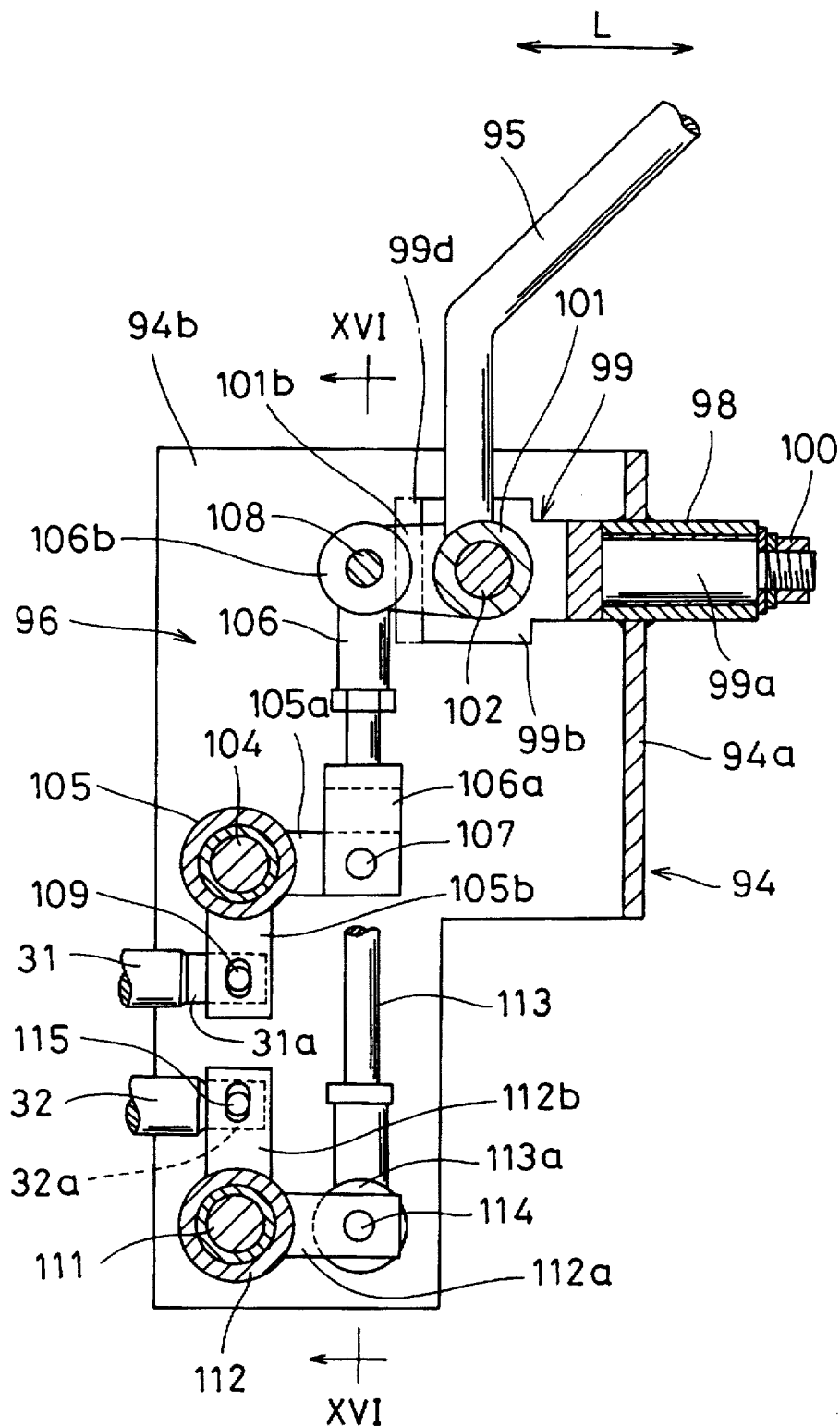
FIG. 15 is a sectional side view showing a control mechanism for the second control valve assembly.
Figure 16:
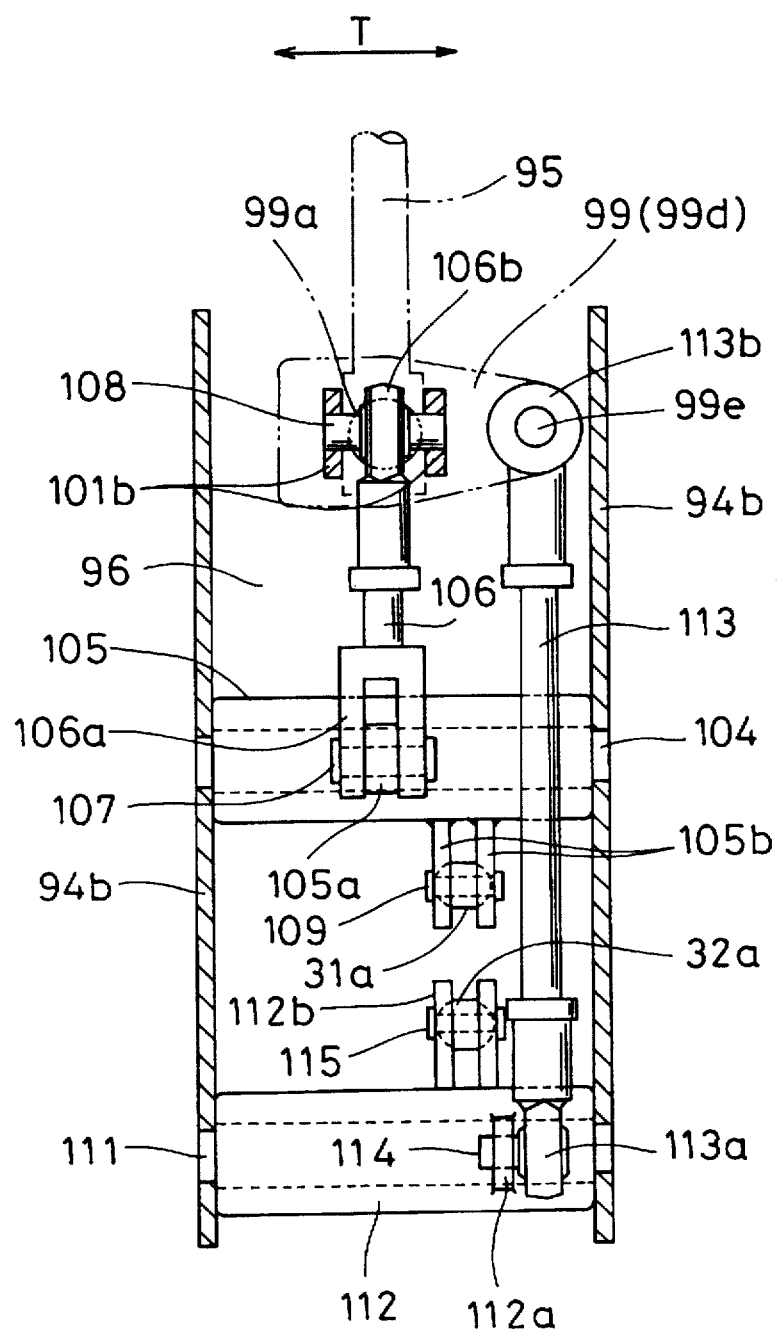
FIG. 16 is a sectional view taken generally along line XVI—XVI of FIG. 15.
Figure 17:
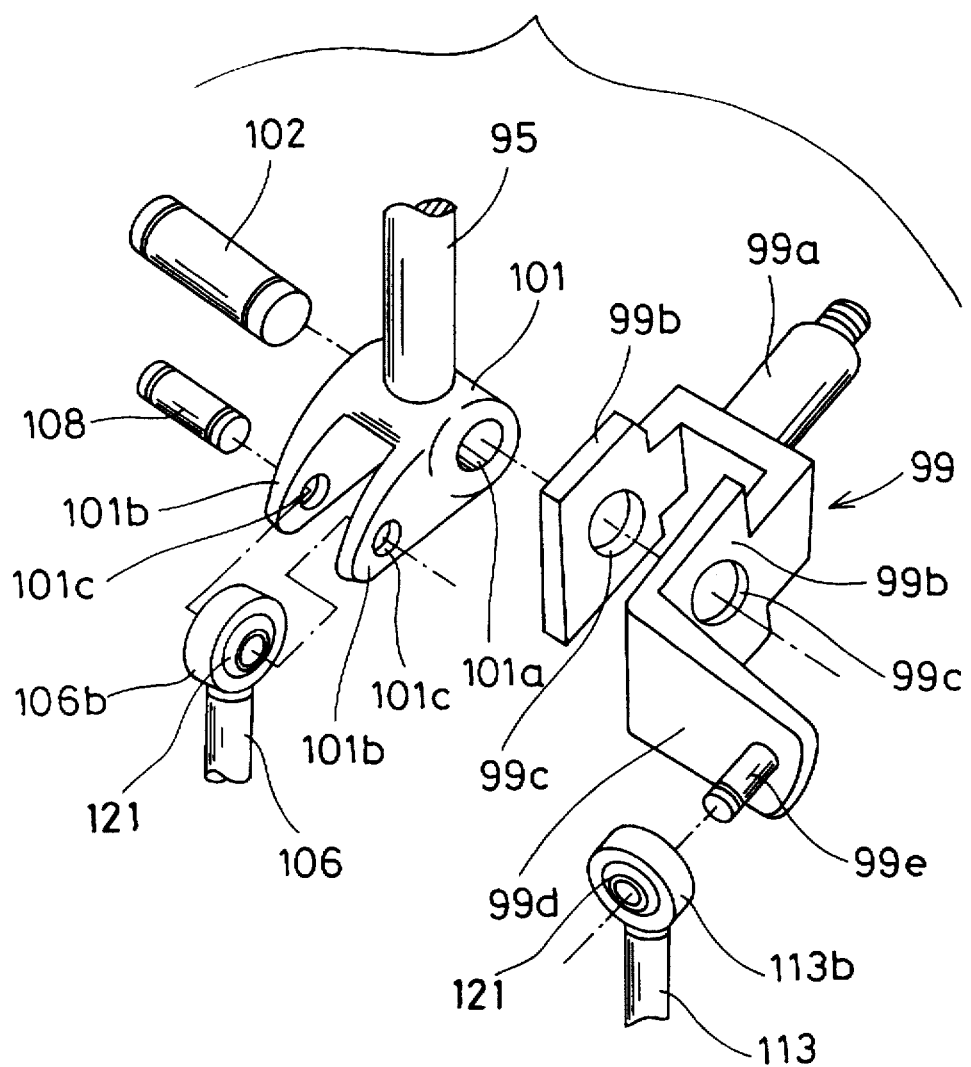
FIG. 17 is a developed perspective view showing some components of the control mechanism shown in FIGS. 15 and 16.

As can be seen from FIGS. 15 and 16, the support frame 94 has a generally C-shaped configuration comprising a front wall 94a and a pair of left and right side walls 94b. A hollow cylindrical support member 98 extends through the front wall 94a at a location adjacent to the top end thereof and is secured to this wall 94a by welding. As shown in FIGS. 15 to 17, a rotatable frame 99 is arranged within the support frame 94 and has a shaft portion 99a which is rotatably received by the support member 98 and is prevented from getting-away by a nut 100 threadingly mounted on a threaded front end of shaft portion 99a. The rotatable frame 99 has a pair of left and right upstanding wall portions 99b which include pin-passing bores 99c. A rotatable member 101 is secured to the lower end of control lever 95 by welding or the like. This member 101 is adapted to be insertingly received between the upstanding wall portions 99b of rotatable frame 99 and also includes a pin-passing bore 101a. A pin 102 extends through the pin-passing bores 99c and 101a, so that member 101 is supported rotatably about the pin 102 by the rotatable frame 99. Consequently, when the control lever 95 is displaced in an axial direction of the vehicle along arrow L shown in FIG. 15, the rotatable member 101 is rotationally displaced about the pin 102. On the other hand, when the control lever 95 is displaced in a direction across the vehicle along arrow T shown in FIG. 16, the rotatable frame 99 is rotationally displaced about the shaft portion 99a.

The rotatable member 101 has a pair of rearwardly extending integral arm portions 101b which include pin-passing bores 101c. A support shaft 104 is bridged between and supported by the left and right side walls 94b of support frame 94 at an intermediate level within the frame 94. A hollow cylindrical member 105 is rotatably mounted on the support shaft 104 and has a forwardly extending arm 105a attached thereto and a downwardly extending fork 105b also attached to the member 105. A rod 106 extends vertically for operatively connecting between the members 101 and 105. This rod 106 has, at its lower end, a fork 106a which holds the arm 105a and is connected thereto by a pin 107. Rod 106 further has, at its top end, a ball joint 106b, attached thereto, which is placed between the arm portions 101b of rotatable member 101 and is connected to this member 101 by a pin 108. The fork 105b on the cylindrical member 105 holds the flattened operating end 31a of spool 31 and is connected to it using a pin 109. Thus, when the control lever 95 is displaced along arrow L shown in FIG. 15 so that the rotatable member 101 is rotationally displaced about the pin 102, rod 106 is displaced in a vertical direction to rotate the cylindrical member 105 so that the valve spool 31 is axially displaced through the fork 105b.

The rotatable frame 99 further includes an integral arm portion 99d which extends laterally outwardly from an end of the upstanding wall portion 99b of one side. An axially extending pin 99e is attached to an end portion of this arm portion 99d. A support shaft 111 is bridged between and supported by the left and right side walls 94b of support frame 94 at a low level within the frame 94. A hollow cylindrical member 112 is rotatably mounted on the support shaft 111 and has a forwardly extending arm 112a attached thereto and an upwardly extending fork 112b also attached to the member 112. A rod 113 extends vertically for operatively connecting between the rotatable frame 99 and the cylindrical member 112. This rod 113 has, at its lower end, a ball joint 113a, attached thereto, which is connected to the arm 112a by a pin 114. Rod 113 further has, at its top end, another ball joint 113b attached thereto. The joint 113b includes a center bore which receives the pin 99e on the rotatable frame 99. The fork 112b on the cylindrical member 112 holds the flattened operating end 32a of spool 32 and is connected to it using a pin 115. Thus, when the control lever 95 is displaced along arrow T shown in FIG. 16 so that the rotatable frame 99 is rotationally displaced about its shaft portion 99a, rod 113 is displaced in a vertical direction to rotate the cylindrical member 112 so that the valve spool 32 is axially displaced through the fork 112b.

Consequently, the control mechanism 96 is operable to place the lift-control valve 31 in any one of the positions N, U, D and F shown in FIG. 5 by the displacing operation of control lever 95 in the axial direction of the vehicle (direction along arrow L shown in FIG. 15) and also is operable to place the tilt-control valve 32 in any one of the positions N, I, II and III shown in FIG. 5 by the displacing operation of control lever 95 in the direction across the vehicle (direction along arrow T shown in FIG. 16). When the operating force applied to the control lever 95 is released, the lift-control valve 31 is automatically returned from each of its lifting position U and lowering position D to its neutral position N by the action of spring mechanism 65 shown in FIG. 9 while the tilt-control valve 32 is automatically returned from each of its operative positions I, II and III to its neutral position N by the action of spring mechanism 66 shown in FIGS. 8 and 9. By the automatical return of each control valve 31, 32, the control lever 95 is, in turn, returned automatically to its neutral position due to the sliding movement of the control valve. When the operating force applied to the control lever 95 is released after the lift-control valve 31 has been placed in its floating position F shown in FIG. 5, this valve 31 is kept in that position by the action of detent mechanism 67 shown in FIG. 9. For displacing the control valve 31 from this condition, the control lever 95 is operated again.

Figure 18:
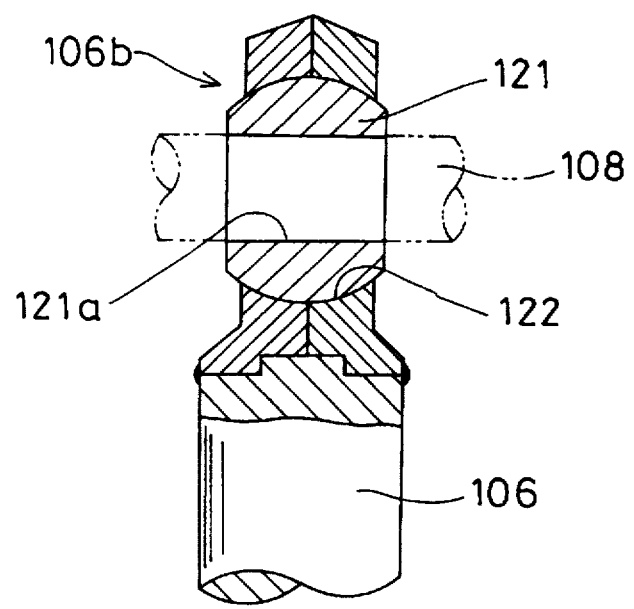
FIG. 18 is an enlarged sectional view showing a ball joint shown in FIGS. 15 through 17.
Figure 19:
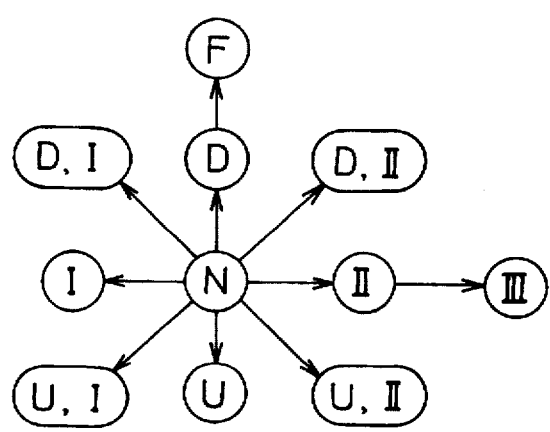
FIG. 19 is a diagram showing shift patterns of two control valves by means of a single control lever shown in FIGS. 15 through 17.

The control mechanism 96 is operable not only to displace the control valves 31 and 32 selectively one at a time, as described above, but to displace both of these two valves simultaneously. As shown in FIG. 18 with respect to the ball joint 106b, the joint comprises a ball 121 which is received by a spherical seat 122 and which includes a pin-passing bore 121a for receiving the pin 108. Each of the other ball joints 113a and 113b is similarly fashioned. Consequently, movement of the control lever 95 in a direction oblique to arrows L and T shown in FIGS. 15 and 16 is permitted by a rolling of the ball 121 within each joint 106b, 113a, 113b. When the control lever 95 is operated to move in such a direction, rod 106 is displaced by an amount corresponding to the component of movement of the lever along arrow L and rod 113 is displaced by an amount corresponding to the component of movement of the lever along arrow T. Thus, both of the control valves 30 and 31 can be displaced at a same time from their optional positions. For example, as shown in FIG. 19, the control lever can be operated to move in an oblique direction so as to displace valves 31 and 32 in a same direction or in reverse directions and to thereby quickly attain lowering and dumping positions D, II; lowering and tilting positions D, I; lifting and dumping positions U, II; or lifting and tilting positions U, I of the valves 31, 32. Efficiency of the operations using the front loader 1 shown in FIG. 1 can be enhanced, for example, by quickly attaining the lowering and dumping positions L, D when earth in the bucket 17 is to be dumped into the carrier compartment of a truck or onto the ground, or by quickly attaining the lifting and tilting positions U, I at the strat of a loading operation in which a truck is loaded with earth scooped from the ground by the bucket 17.

While a preferred embodiment of the invention has been described, it will be appreciated that various modifications and changes may be made without departing from the spirit and scope of the appended claims.

We claim:

1. In a working vehicle comprising: a hydraulic lift cylinder for lifting and lowering an auxiliary implement to be connected liftably to the vehicle, said lift cylinder having a cylinder case; a single hydraulic pump for supplying fluid to said lift cylinder and to plural another hydraulic actuators employed in the vehicle; a first control valve assembly for controlling the operation of said lift cylinder, said first control valve assembly being mounted on said cylinder case; and a second control valve assembly for controlling the operation of said hydraulic actuators, said second control valve assembly being adapted such that fluid is supplied to said first control valve assembly through said second control valve assembly, a fluid supply assembly characterized in:

that said cylinder case (13) includes, in one of its side surfaces, a generally vertical seating surface (52) on which a valve case (53) for said second control valve assembly (20) is mounted;

that plural control valves (31, 32) for controlling the supply of fluid to said plural hydraulic actuators (18, 19) are composed of plural spools which are arranged in said valve case (53) such that said plural spools extend axially of the vehicle at levels different from one another;

that a fluid inlet port (26) for said second control valve assembly (20), a fluid outlet port (27) for conducting fluid from said second control valve assembly towards said first control valve assembly (15), and a fluid drain port (30) for said second control valve assembly are formed in said valve case (53) such that at least said fluid outlet port and said fluid drain port open at said seating surface (52); and that fluid output ports (28A, 28B, 29A, 29B) for connecting said second control valve assembly (20) to said hydraulic actuators (18, 19) are formed in said valve case (53) such that said fluid output ports open at an outer side surface of said valve case.

2. The fluid supply assembly as set forth in claim 1, wherein said fluid inlet port (26) is formed in said valve case (53) such that said inlet port opens at said seating surface (52), and wherein said cylinder case (13) includes a pump port (24) to be connected to said hydraulic pump (23), said inlet port and said pump port being connected to each other through a fluid passage (58, 61) in said cylinder case.

3. The fluid supply assembly as set forth in claim 2, wherein said pump port (24) is formed in a cylinder head (13a) of said cylinder case (13) such that said pump port opens at an outer end surface of said cylinder head.

4. The fluid supply assembly as set forth in claim 2, wherein said valve case (53) includes, in its joint surface (53a) which is in contact with said seating surface (52), a sealed surface area which is enclosed by an endless sealing member (54), said inlet port (26), said outlet port (27) and said drain port (30) opening at said sealed surface area.

5. The fluid supply assembly as set forth in claim 1, wherein said cylinder case (13) is mounted on an upper surface of a transmission casing (7), which constitutes a part of the vehicle body, such that an opening (7a) in a top wall of said transmission casing is closed by said cylinder case, said cylinder case including a fluid passage (60) for communicating said fluid drain port (30) to an inside of said transmission casing through said opening.

6. The fluid supply assembly as set forth in claim 5, wherein said first control valve assembly (15) is mounted on a lower surface of said cylinder case (13) such that said first control valve assembly extends into said transmission casing (7) through said opening (7a), said cylinder case including a fluid passage (59) for connecting said fluid outlet port (27) to said first control valve assembly.

7. The fluid supply assembly as set forth in claim 1 or 5, wherein said cylinder case (13) includes a fluid passage (75, 76) for conducting fluid from said first control valve assembly (15) to said hydraulic lift cylinder (14), and wherein a stop valve (43) for selectively blocking the said fluid passage is disposed in a cylinder head (13a) of said cylinder case, said stop valve extending generally axially of the vehicle and having an operating portion (86a) apart axially outwardly from an outer end face of said cylinder head.

8. The fluid supply assembly as set forth in claim 1, wherein two of said plural control valves (31, 32) are associated respectively with check valves (34, 35) which allow the flow of fluid only from said fluid inlet port (26) towards said two control valves, one of said check valves being inserted in said valve case (53) from an upper side of said valve case while the other check valve being inserted in said valve case from a lower side of said valve case.

9. The fluid supply assembly as set forth in claim 1, wherein said fluid output ports (28A, 28B, 29A, 29B) are associated with adjustable pipe-fittings (28a, 28b, 29a, 29b) for varying the directions of end openings of said fluid outlet ports.

10. The fluid supply assembly as set forth in claim 1, wherein at least two of said plural control valves (31, 32) include operating ends (31a, 32a) extending outwardly of said valve case (53) towards a front end of a seat (10) which is disposed at a location above said cylinder case (13), said two control valves being adapted to be displacingly operated by a control mechanism (96) which is arranged at a laterally outside location below a front end portion of said seat.

11. The fluid supply assembly as set forth in claim 10, wherein said control mechanism (96) is adapted to be operated by a single control lever (95) such that said control mechanism is operable to displace said two control valves (31, 32) selectively one at a time or simultaneously.

* * * * *

UNITED STATES PATENT AND TRADEMARK OFFICE
CERTIFICATE OF CORRECTION

PATENT NO. : 5,720,214
DATED : February 24, 1998
INVENTOR(S) : Masahisa Kawamura et al.

It is certified that error appears in the above-indentified patent and that said Letters Patent is hereby corrected as shown below:

Column 16, line 49, delete "another" and substitute therefor
-- other --.

Signed and Sealed this

Ninth Day of June, 1998

BRUCE LEHMAN

*Attest:*

*Attesting Officer*          *Commissioner of Patents and Trademarks*